US008260809B2

(12) United States Patent
Platt et al.

(10) Patent No.: US 8,260,809 B2
(45) Date of Patent: Sep. 4, 2012

(54) VOICE-BASED SEARCH PROCESSING

(75) Inventors: John C. Platt, Bellevue, WA (US); Gary W. Flake, Bellevue, WA (US); Ramez Naam, Seattle, WA (US); Anoop Gupta, Woodinville, WA (US); Oliver Hurst-Hiller, New York, NY (US); Trenholme J. Griffin, Bainbridge Island, WA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 11/770,535

(22) Filed: Jun. 28, 2007

(65) Prior Publication Data

US 2009/0006345 A1    Jan. 1, 2009

(51) Int. Cl.
G06F 7/00 (2006.01)
G06F 17/30 (2006.01)
(52) U.S. Cl. .................................. 707/771; 707/784
(58) Field of Classification Search .............. 707/1–10, 707/100–104.1, 110, 771, 784
See application file for complete search history.

(56) References Cited

U.S. PATENT DOCUMENTS

| | | | |
|---|---|---|---|
| 6,853,998 B2 | 2/2005 | Biebesheimer et al. | |
| 6,947,924 B2 | 9/2005 | Bates et al. | |
| 6,968,333 B2 | 11/2005 | Abott et al. | |
| 2001/0054041 A1 | 12/2001 | Chang | |
| 2003/0033288 A1* | 2/2003 | Shanahan et al. | 707/3 |
| 2003/0105634 A1* | 6/2003 | Abella et al. | 704/257 |
| 2005/0102282 A1 | 5/2005 | Linden | |
| 2005/0125382 A1 | 6/2005 | Karnawat et al. | |
| 2005/0125390 A1 | 6/2005 | Hurst-Hiller et al. | |
| 2005/0210024 A1 | 9/2005 | Hurst-Hiller et al. | |
| 2005/0216269 A1* | 9/2005 | Scahill et al. | 704/270.1 |
| 2005/0278317 A1 | 12/2005 | Gross et al. | |
| 2006/0004691 A1 | 1/2006 | Sifry | |
| 2006/0064411 A1 | 3/2006 | Gross et al. | |
| 2006/0069612 A1 | 3/2006 | Hurt et al. | |
| 2007/0060099 A1* | 3/2007 | Ramer et al. | 455/405 |
| 2007/0071206 A1* | 3/2007 | Gainsboro et al. | 379/168 |
| 2009/0006343 A1* | 1/2009 | Platt et al. | 707/4 |
| 2009/0006344 A1* | 1/2009 | Platt et al. | 707/4 |

OTHER PUBLICATIONS

Susan Gauch, et al. Ontology-Based Personalized Search and Browsing. http://www.ittc.ku.edu/~sgauch/papers/UMUAIResubmit.pdf. Last accessed Apr. 11, 2006.

(Continued)

*Primary Examiner* — Usmaan Saeed
*Assistant Examiner* — Navneet K Ahluwalia
(74) *Attorney, Agent, or Firm* — Lee & Hayes, PLLC

(57) ABSTRACT

Architecture for completing search queries by using artificial intelligence based schemes to infer search intentions of users. Partial queries are completed dynamically in real time. Additionally, search aliasing can also be employed. Custom tuning can be performed based on at least query inputs in the form of text, graffiti, images, handwriting, voice, audio, and video signals. Natural language processing occurs, along with handwriting recognition and slang recognition. The system includes a classifier that receives a partial query as input, accesses a query database based on contents of the query input, and infers an intended search goal from query information stored on the query database. A query formulation engine receives search information associated with the intended search goal and generates a completed formal query for execution.

18 Claims, 23 Drawing Sheets

OTHER PUBLICATIONS

Masahiro Morita, et al. Information Filtering Based on User Behavior Analysis and Best Match Text Retrieval. http://delivery.acm.org/10.1145/190000/188583/p272-morita.pdf?key1=188583&key2=3464564411&coll=GUIDE&dl=GUIDE& FID=69150382&CFTOKEN=87152358. Last accessed Apr. 11, 2006.

Laura A. Granka, et al. Eye-Tracking Analysis of User Behavior in WWW Search. http://delivery.acm.org/10.1145/1010000/1009079/p478-granka.pdf?key1=1009079&key2=2615564411&coll=GUIDE&dl=GUIDE&CFID=691507 12&CFTOKEN=85342844. Last accessed Apr. 11, 2006.

Peter G. Anick, et al. The Paraphrase Search Assistant: Terminological Feedback for Iterative Information Seeking http://delivery.acm.org/10.1145/320000/312670/p153-anick.pdf?key1=312670&key2=3025564411&coll=GUIDE&dl=GUIDE&CFID=69150716& CFTOKEN=59306657. Last accessed Apr. 11, 2006.

Google Suggest. Dec. 2004. http://www.google.com/webhp?complete=1&hl=en.

* cited by examiner

VOICE-BASED SEARCH PROCESSING

BACKGROUND

Today more than ever, information plays an increasingly important role in the lives of individuals and companies. The Internet has transformed how goods and services are bought and sold between consumers, between businesses and consumers, and between businesses. In a macro sense, highly-competitive business environments cannot afford to squander any resources. Better examination of the data stored on systems, and the value of the information can be crucial to better align company strategies with greater business goals. In a micro sense, decisions by machine processes can impact the way a system reacts and/or a human interacts to handling data.

A basic premise is that information affects performance at least insofar as its accessibility is concerned. Accordingly, information has value because an entity (whether human or non-human) can typically take different actions depending on what is learned, thereby obtaining higher benefits or incurring lower costs as a result of knowing the information. In one example, accurate, timely, and relevant information saves transportation agencies both time and money through increased efficiency, improved productivity, and rapid deployment of innovations. In the realm of large government agencies, access to research results allows one agency to benefit from the experiences of other agencies and to avoid costly duplication of effort.

The vast amounts of information being stored on networks (e.g., the Internet) and computers are becoming more accessible to many different entities, including both machines and humans. However, because there is so much information available for searching, the search results are just as daunting to review for the desired information as the volumes of information from which the results were obtained.

Some conventional systems employ ranking systems (e.g., page ranking) that prioritize returned results to aid the user in reviewing the search results. However, the user is oftentimes still forced to sift through the long ordered lists of document snippets returned by the engines, which is time-consuming and inconvenient for identifying relevant topics inside the results. These ordered lists can be obtained from underlying processes that cluster or group results to provide some sort of prioritized list of likely results for the user. However, clustering has yet to be deployed on most major search engines. Accordingly, improved search methodologies are desired to provide not only more efficient searching but more effect searching, and moreover, not only at a high level, but in more focused regimes.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed aspects facilitates generation of search queries by using artificial intelligence based schemes to infer search intents of users, and complete, modify and/or augment queries in real time to improve search results as well as reducing query input time. For example, based on historical information about search habits and search content of a user, as the user is typing in a search query, the system automatically and dynamically completes the query formation (or offers a pull-down menu of a short list of inferred search queries).

Accordingly, the aspects disclosed and claimed herein, in one aspect thereof, comprises a classifier that receives a partial query as input, accesses a query database based on contents of the query input, and infers an intended search goal from query information stored on the query database. A query formulation engine receives search information associated with the intended search goal and generates a completed formal query for execution.

In another aspect, search aliasing can also be employed that associates other characters, words, and/or phrases with the partial search query rather than the completing the characters initial input.

In yet another aspect, a user can custom tune their query formulation engine to understand new lingo/graffiti, shorthand, etc., and reformulate such language to a conventional search query that provides a high probability of obtaining desired search results. The graffiti dictionary can be tuned by modifying individual entries, changing adjustment values, retraining a recorded stroke data, or adding new stroke entries altogether.

The various embodiments can also include natural language processing components, graffiti recognition components, hand-writing recognition components, voice recognition (including slang) components, etc. Accordingly, a voice-based query formulation engine can decipher spoken words or portions thereof, infer intent of the user, and formulate a comprehensive search query based on utterances.

In other aspects, ecosystem definition, selection, and tagging capability is provided. At an application level, for example, the search ecosystem can be limited to a single application and any data, code, objects, etc., related to that application or a single website environment having many different applications. Alternatively, given a suite of applications, the ecosystem to be searched can be limited to all applications in that suite.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
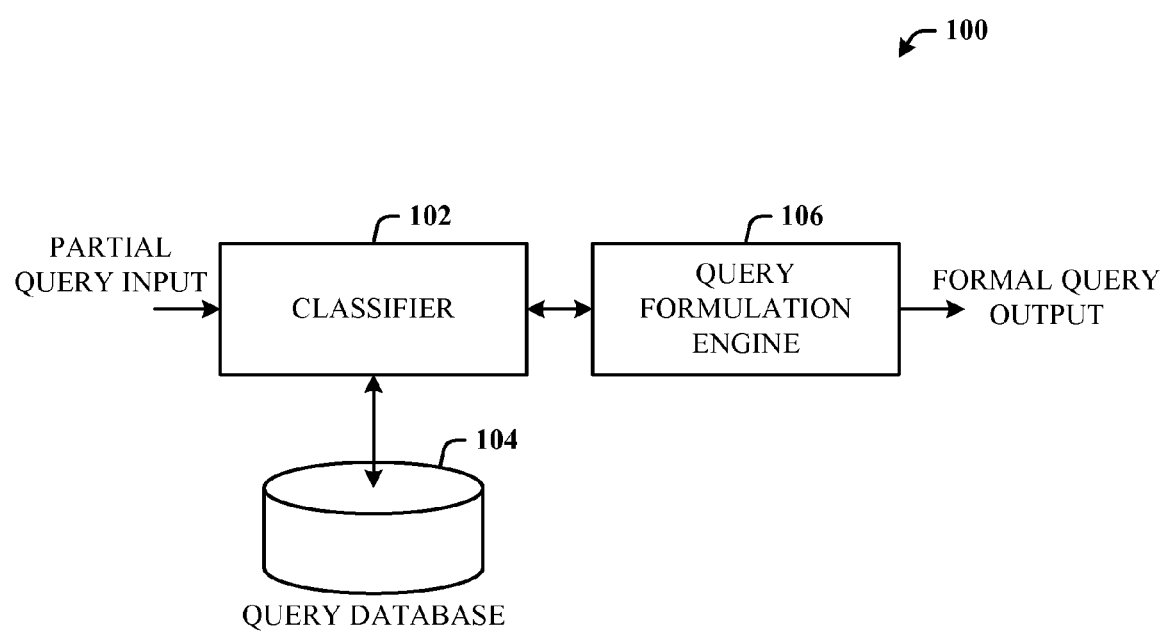
FIG. 1 illustrates a computer-implemented system that facilitates inference processing of partial query inputs in accordance with the subject innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The disclosed architecture facilitates generation of search queries by using artificial intelligence based schemes to infer search intents of users, and complete, modify and/or augment queries in real time to improve search results as well as reduce query input time. For example, based on historical information about search habits and search content of a user, as the user is typing in a search query the system completes it (or offers a pull down menu of a short list of inferred search queries).

Additionally, search aliasing can also be employed that associates searching for a hotel and flight, for example, with "book a vacation to <destination>" query input phraseology. Context can also be considered so that if a user's current status is reading a movie review (e.g., with high viewer and critic ratings at about 7 PM on a Friday), and the user starts typing in as a query "sh", the various aspects can complete the query as ("show times and locations for Troy in Solon, Ohio"). Over time, users can custom tune their query formulation engines to understand new lingo/graffiti, short-hand, etc., and reformulate such language to a conventional search query that provides a high probability of obtaining desired search results. Graffiti includes stylus-based strokes recognized by comparing each entered stylus stroke to entries in a profile or dictionary of recorded strokes and the characters represented. The graffiti dictionary can be tuned by modifying individual entries, changing adjustment values, retraining a recorded stroke data, or adding new stroke entries altogether.

The architecture can also process natural language queries, graffiti, hand-writing, voice inputs (including slang), etc., from any of which a partial query can be derived, and for which inferred query information is obtained to provide a formal completed query for execution.

Referring initially to the drawings, FIG. 1 illustrates a computer-implemented system 100 that facilitates inference processing of partial query inputs in accordance with the subject innovation. The system 100 includes a classifier 102 that receives a partial query as input, accesses a query database 104 based on contents of the query input, and infers an intended search goal from query information stored on the query database. A query formulation engine 106 receives search information associated with the intended search goal and generates a completed formal query for execution.

Figure 2:
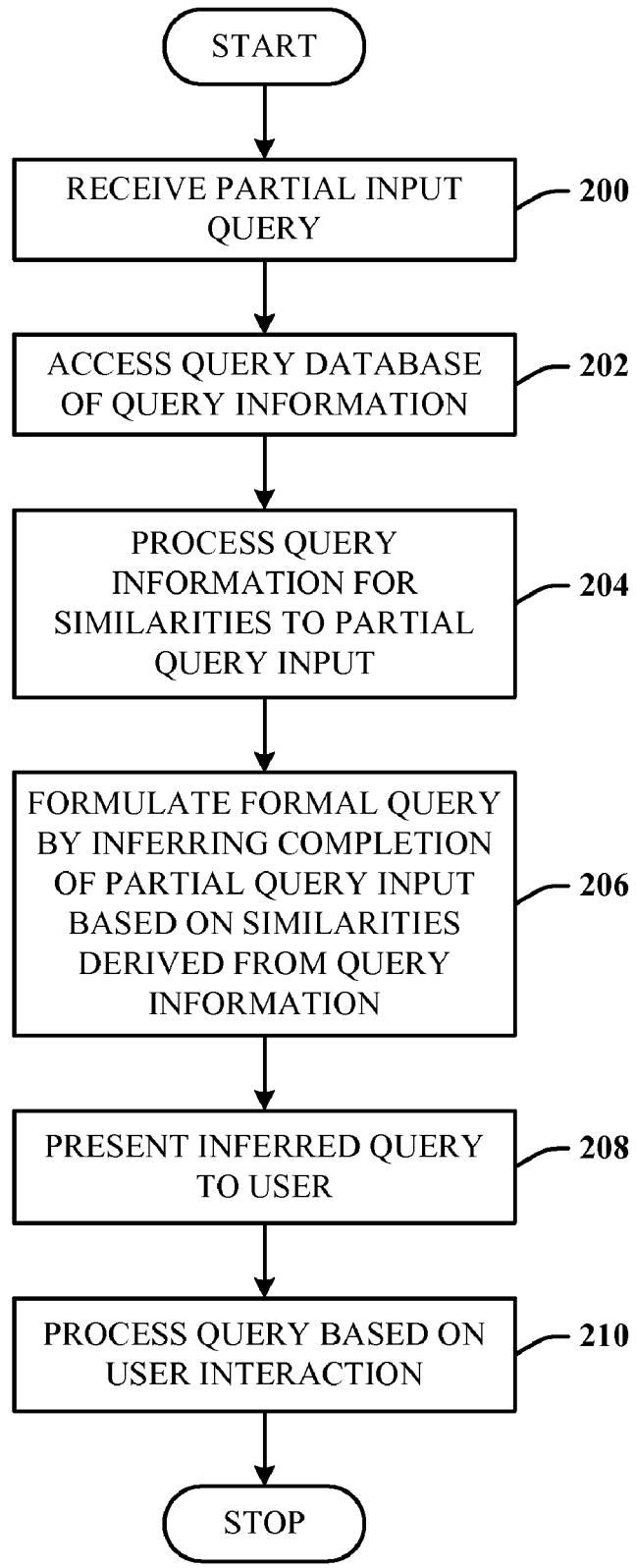
FIG. 2 illustrates a methodology of processing a query in accordance with an innovative aspect.

FIG. 2 illustrates a methodology of processing a query in accordance with an innovative aspect. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a partial query input is received. This can be by a user beginning to type characters into a field of a search interface. At 202, a classifier that receives the partial input accesses a query database of query information. At 204, the query information is processed by at least the classifier to retrieve similar or matching character sets, terms, and/or phrases inferred thereby for completion of the partial query. At 206, the inferred query information is then forwarded to the formulation engine for completion of the partial query. At 208, the formulated query is then presented as a completed query to the user. The user then interacts to facilitate processing of the query, as indicated at 210.

Figure 3:
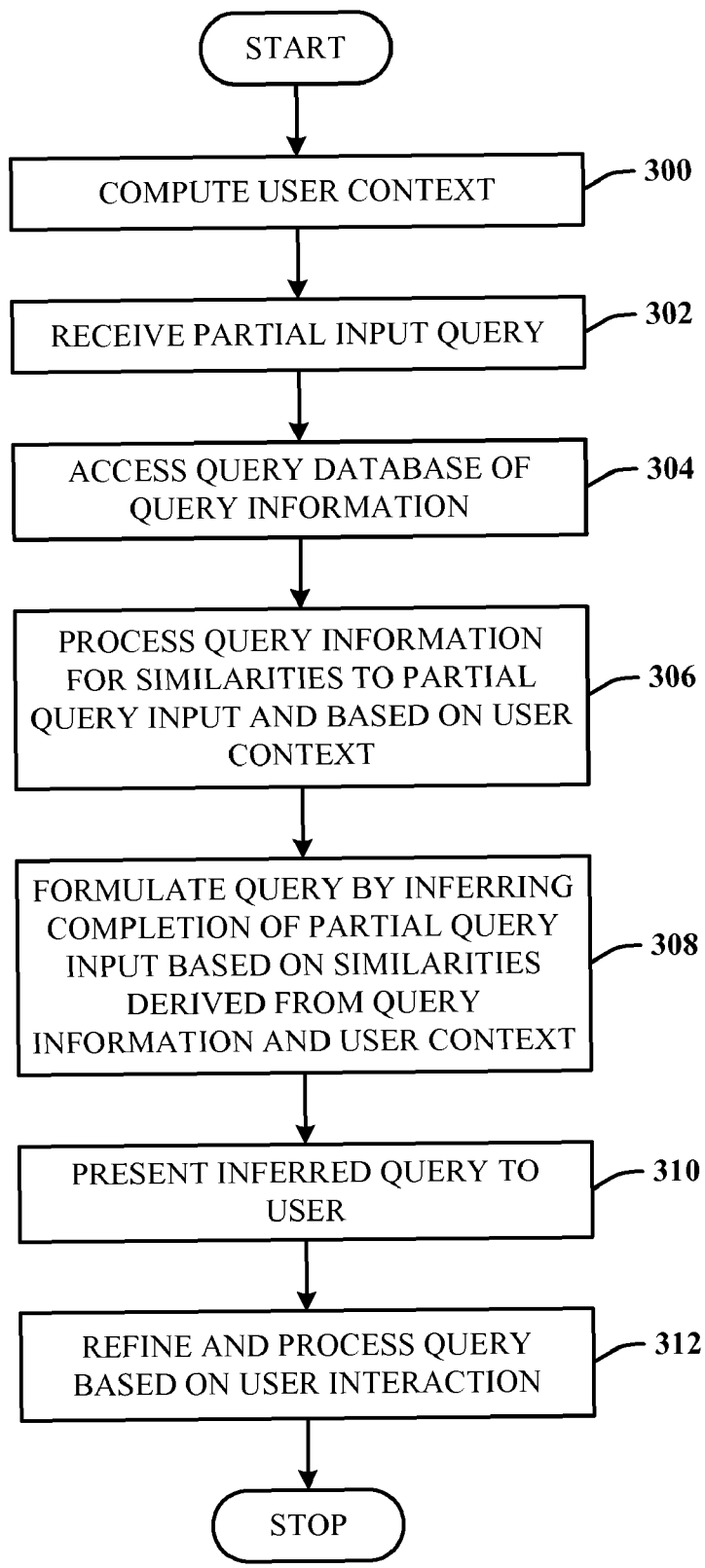
FIG. 3 illustrates a methodology of completing the partial query based on user context, in accordance with another aspect.

Referring now to FIG. 3, there is illustrated a methodology of completing the partial query based on user context in accordance with another aspect. At 300, user context is computed. Context, in this sense, can include the type of software environment from which the user is initiating the search. For example, if the user initiates the search from within a programming application environment, the context can be inferred to be related to programming. Similarly, if the user initiates a search while in a word processing application, it can be inferred that the user context relates to word processing. In another example, if the user initiates a search query from within a browser, and the query terms indicate a high probability of being related to historical terms, it can be further be inferred that the intended goal of the user is related to historical sites and information. Thus, context information can be utilized to further focus the search. At 302, a partial query input is received. Note that this input can be in the form of text, speech utterances, graffiti strokes, and other similar forms of input techniques.

At 304, a classifier receives the partial input and accesses a query database of query information. At 306, the query information is processed by at least the classifier to facilitate retrieval of similar or matching character sets, terms, phrases, or combinations thereof, based on the partial query input and context information, and inferred thereby for completion of the partial query. At 308, the inferred query information is then forwarded to the formulation engine for formulation of a completed query based on the inferred similarities or matches derived from the query information and user context. At 310, the formulated query is then presented as a completed query to the user, and the user then interacts to facilitate refinement and/or processing of the query, as indicated at 312.

Figure 4:
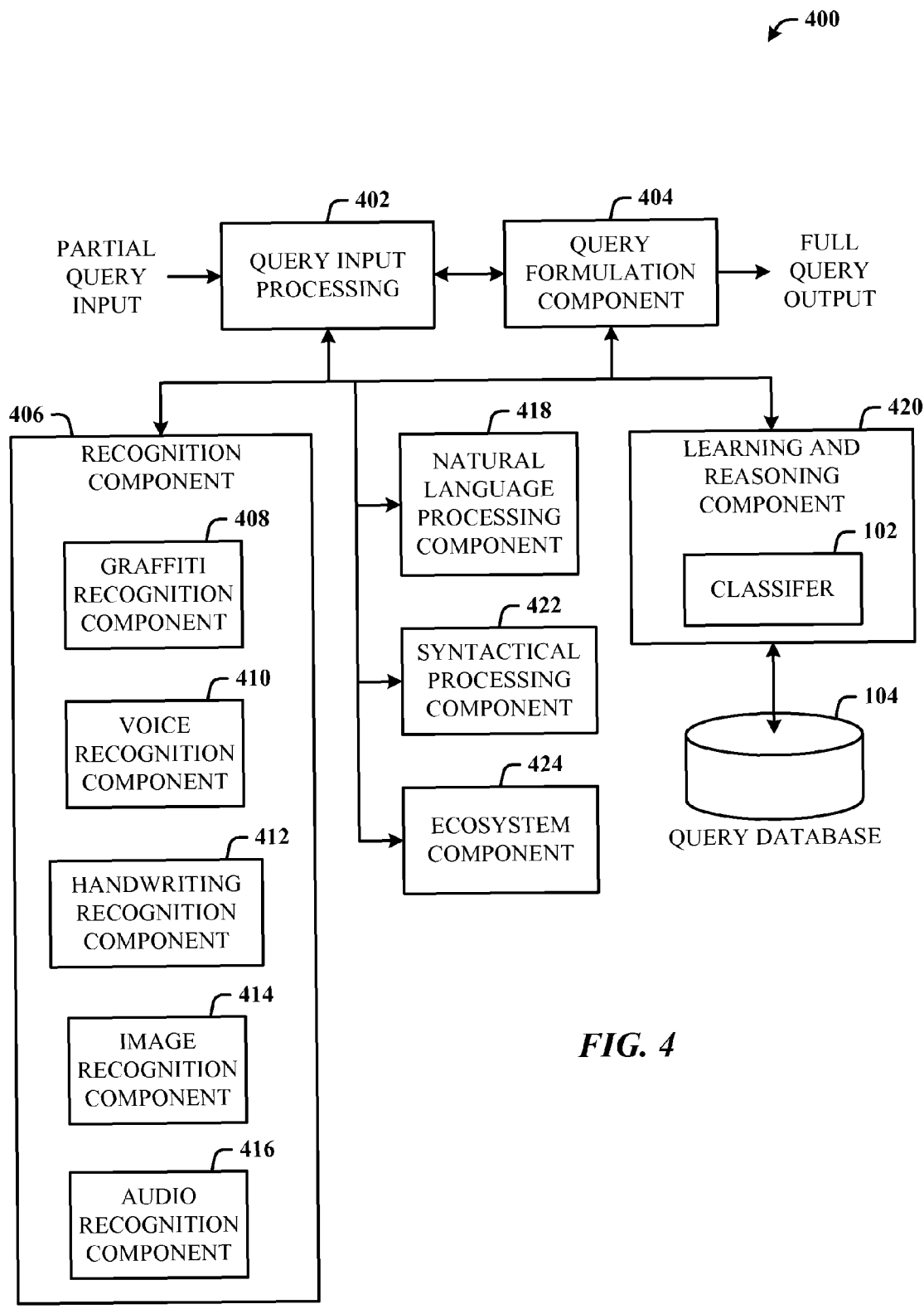
FIG. 4 illustrates a more detailed system that facilitates inferred query formulation in accordance with another aspect of the innovation.

FIG. 4 illustrates a more detailed system 400 that facilitates inferred query formulation in accordance with another aspect of the innovation. The system 400 includes a query input processing component 402 for receiving a partial query input and a query formulation component 404 (similar to the query formulation engine 106 of FIG. 1) for completing the partial query and outputting a completed (or full) query based on inferred query information.

The system 400 can also include a recognition system 406 for performing recognition processing of various types of query inputs. A graffiti recognition component 408 processes graffiti-type input queries. For example, the query input can be in the form of graffiti; that is, graphical interpretation mechanisms that receive strokes or other similar indicia, for example, which can be interpreted as alphanumeric characters. Graffiti interpretation and processing subsystems can be found in stylus-based portable computing devices such as table PCs, for example. In more robust systems, graffiti can be used to mean combinations of characters, terms or phrases or combinations thereof. In other words, a single stroke that moves left-to-right and then up, can be programmed to mean Eastern Airlines to Canada, for example.

The recognition system 406 can also include a voice recognition component 410 that receives and process utterances from the user. These utterances are then analyzed and processed for information that can be utilized as partial query input. A handwriting recognition component 412 is employed for handwriting recognition in a system that supports such capability. The input can be purely textual (e.g., alphanumeric characters, Unicode characters, . . . ) and/or spoken natural language terms and/or phrases. An image component 414 can also be utilized to receive images (still images and video frames to snippets) as inputs for analysis and processing to obtain information that can be used in a query process. For example, an image (digital or analog) of the nation's capitol can be analyzed, and from it, inferred that the user desires to input a query about Washington, D.C. An audio recognition component 416 facilitates input analysis and processing of audio information (e.g., music) that is not necessarily voice or speech signals.

A natural language processing component 418 facilitates analysis and processing of natural language input streams. The input can be purely textual, and/or spoken natural language terms and/or phrases as analyzed and processed by the voice recognition component 410.

The recognition component 406 can operate to perform analysis and processing of multiple different types of sequential inputs (e.g., spoken words followed by keyed textual input) as well as combined inputs such as found in songs (e.g., combinations of words and music or text on an image). In the example of songs, the music and the words can both be analyzed along with user context and other information to arrive at the inferred query information for formulation and completion of the partial input query.

The system 400 can also include the classifier 102 as part of a machine learning and reasoning (MLR) component 420. The classifier 102 can access the query database 104, as described in FIG. 1. The MLR component 420 facilitates automating one or more features in accordance with the subject innovation. An aspect (e.g., in connection with selection) can employ various MLR-based schemes for carrying out various aspects thereof. For example, a process for determining what query information will be considered for formulation of the completed query can be facilitated via an automatic classifier system and process. Moreover, where the database 104 is distributed over several locations, or comprises several unrelated data sources, the classifier can be employed to determine which database(s) will be selected for query processing.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In the case of database systems, for example, attributes can be words or phrases or other data-specific attributes derived from the words (e.g., database tables, the presence of key terms), and the classes are categories or areas of interest (e.g., levels of priorities).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data.

Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of ranking or priority.

As will be readily appreciated from the subject specification, the one or more aspects can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

A syntactical processing component 422 can also be employed to analyze the structure of the way words and symbols are used in the partial query input, and to compare common language usage as well as more specific syntax properties for resolving the formal completed output query. This is described further infra.

An ecosystem component 424 can also be provided that facilitates at least defining and marking (or tagging) selected areas of a defined ecosystem such that searching can be based on these tags or markings. This feature finds application as an aid to website developers to develop content for search. The developer will know the objects present; however, by the use of markers or tags, no specialized code needs to be written. In other words, by the developer tagging the objects, searching will be conducted over only those objects. Moreover, tags can be defined to associate with a type of object (e.g., image versus text, audio versus image, and so on). It can be learned and reasoned that as the developer begins to tag certain types of objects, the system can complete the tagging process for all similar objects, thereby expediting the process.

At a programming or development level, searching can be into the syntax, for example, where as the developer inputs data (e.g., text), completion can be automatically learned and performed. In other words, it can be learned and reasoned that programming languages use a certain syntax, and as the programmer begins to insert a character string (text, types, annotations, delimiters, if-then, symbols, special characters, etc.) that has been employed previously, automatic completion can present inferred characters for insertion.

Figure 5:
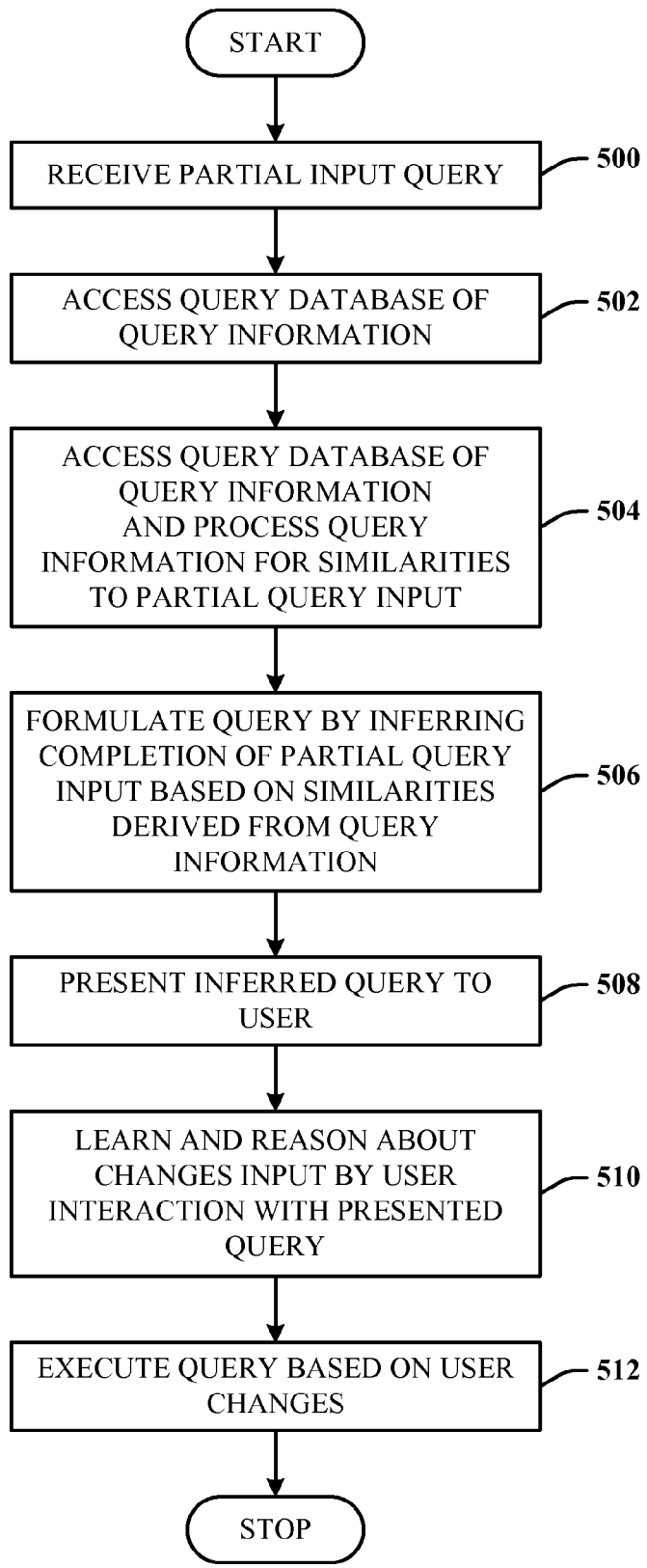
FIG. 5 illustrates a methodology of learning and reasoning about user interaction during the query process.

FIG. 5 illustrates a methodology of learning and reasoning about user interaction during the query process. At 500, a partial query input is received. This can be by a user beginning to utter voice commands into a search interface. At 502, a classifier that receives the partial input accesses a query database of query information. At 504, the query information is processed by at least the classifier to retrieve similar or matching character sets, terms, and/or phrases inferred there from for completion of the partial query. At 506, the inferred query information is then forwarded to the formulation engine for completion of the partial query. At 508, the formulated query is then presented as a completed query to the user. The system learns and reasons about user interaction with the inferred formulated query, as indicated at 510. At 512, the final query is executed based on the user changes. Thus, next time the user initiates a search of similar input, the learned response can be utilized to infer that the user may again, desire to see related information.

Figure 6:
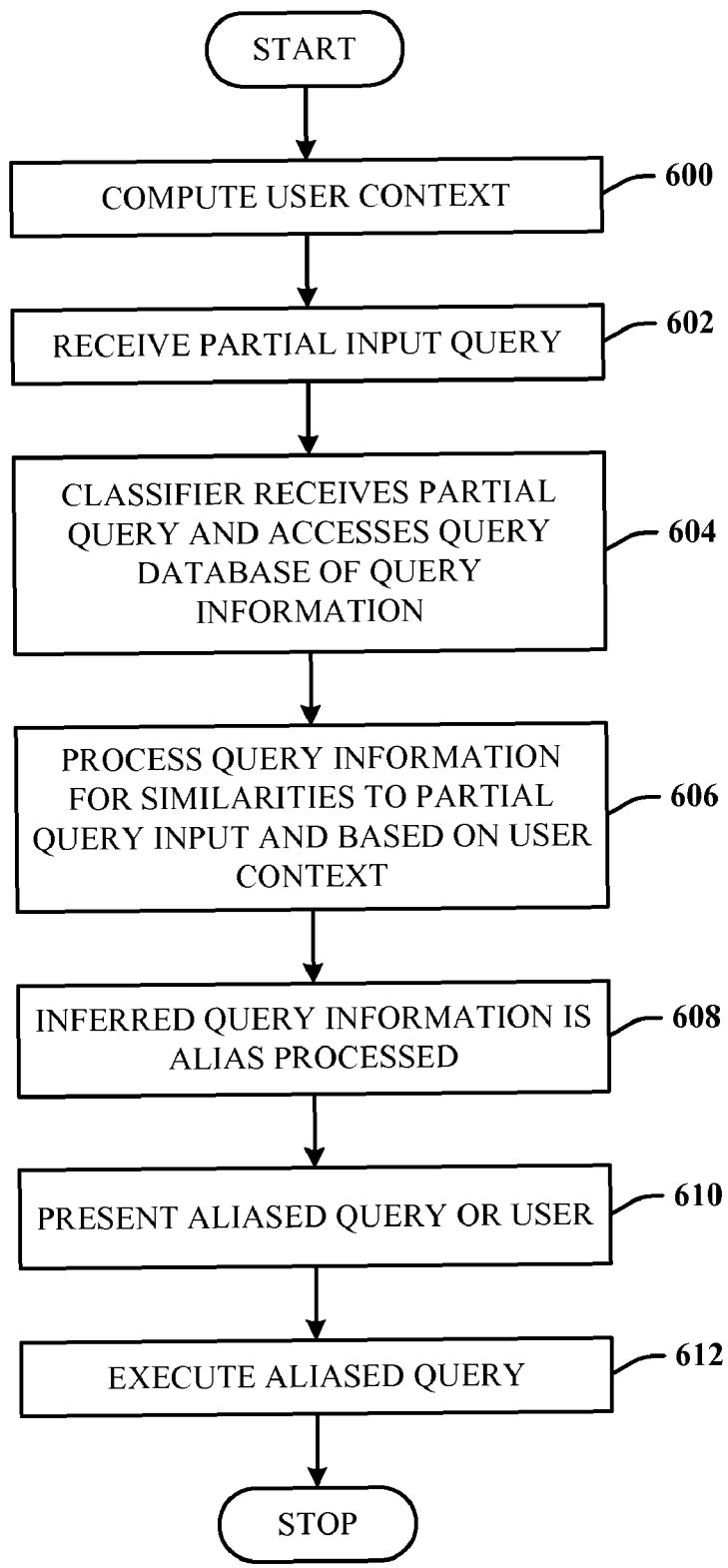
FIG. 6 illustrates a methodology of query aliasing and context processing in accordance with the disclosed innovation.

Referring now to FIG. 6, there is illustrated a methodology of query aliasing and context processing in accordance with the disclosed innovation. At 600, user context is computed. As before, context can include the type of software environment from which the user is initiating the search, whether a programming application, word processing application, browser program, etc. The context information can be utilized to further focus the search. At 602, a partial query input is received in any single or combination of forms such as text, speech utterances, audio, graffiti strokes, for example.

At 604, a classifier receives the partial input and accesses a query database of query information. At 606, the query information is processed by at least the classifier to facilitate retrieval of similar or matching character sets, terms, and/or phrases based on the partial query input and context information, and inferred thereby for completion of the partial query. At 608, the inferred query information is then sent for alias processing. In one implementation, this can be performed as part of the formulation process. At 610, once the aliased query is determined, it can be presented as a completed query to the user, and then automatically executed to return search results, as indicated at 612.

Figure 7:
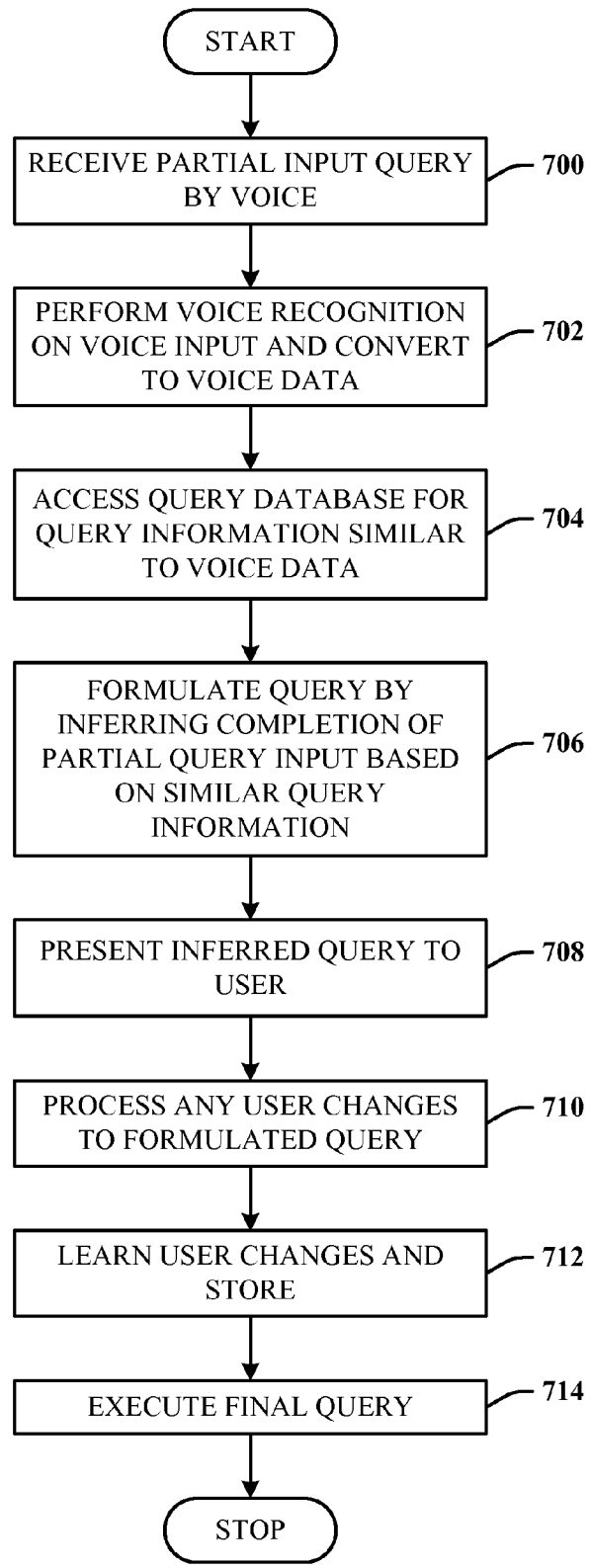
FIG. 7 illustrates a flow diagram of a methodology of voice recognition processing for inferring query information for partial query completing in accordance with an aspect.

FIG. 7 is a flow diagram of a methodology of voice recognition processing for inferring query information for partial query completing in accordance with an aspect. At 700, voice signals are received for processing as a partial query input. The voice signals also can be stored for later analysis and processing. At 702, voice recognition analysis and processing is performed on the voice signals to convert the signals to voice data that can be utilized in query database processing. At 704, the query database is accessed for query information that can be inferred as sufficiently similar to aspects of the partial query to be considered as solutions for completing the query.

At 706, the final query is formulated based on the inferred information. At 708, the user is presented with the final query, since the system dynamically processes the partial input query and inserts the inferred formulated query for presentation to the user. At 710, at this time, the user can edit any part of the presented query (e.g., characters) to arrive at the desired final query. At 712, the system learns the user edits and reasons about the edits for subsequent processing of another user query. The final complete query is then executed to return search results, as indicated at 714.

As indicated above, the system can operate to dynamically track and process user edits or changes to the formulated query once presented. For example, if after viewing the presented query, the user chooses to delete one or more characters, the system then operates to re-evaluate the now partial query for inferred completion. The system will learn and reason to not complete the query using the same information as previously provided, but to select different information. Alternatively, the user can select to disable a first follow-up re-evaluation of an inferred formulated query, or limit the system to any number of subsequent re-evaluations (e.g., no more than three).

Figure 8:
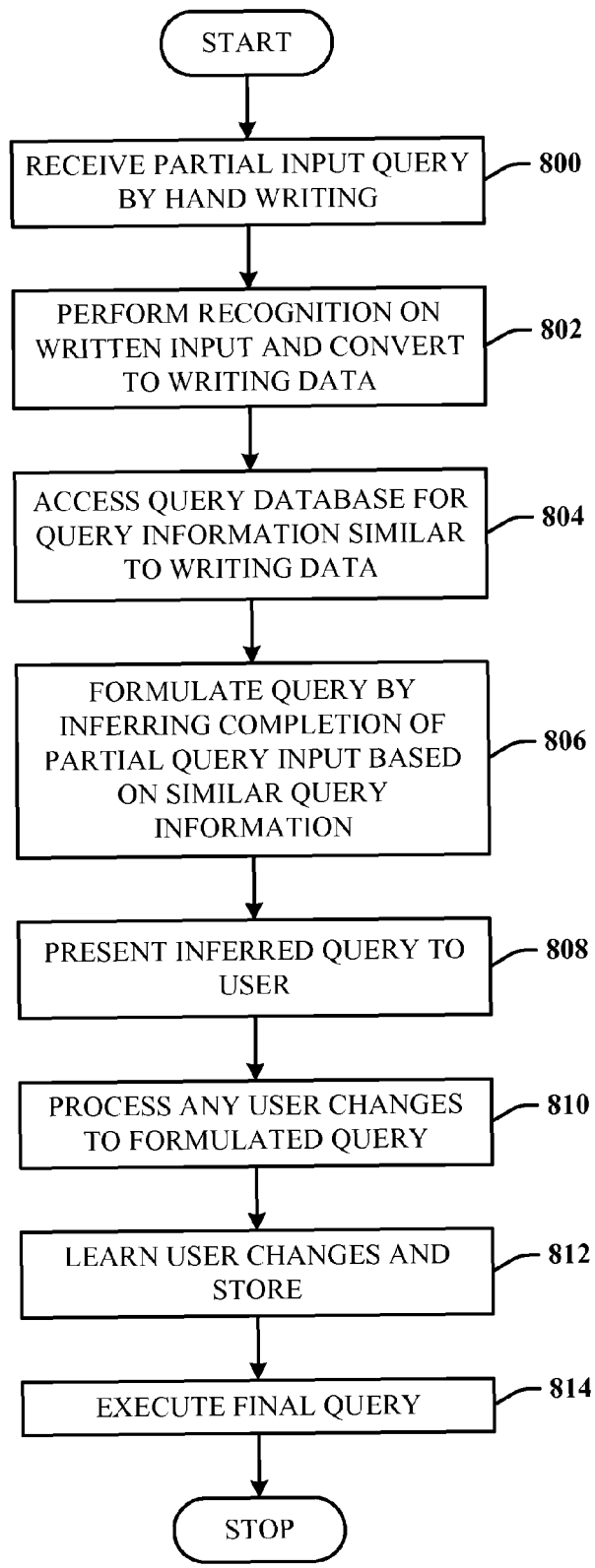
FIG. 8 illustrates a flow diagram that represents a methodology of analyzing and processing query input by handwriting in accordance with an innovative aspect.

FIG. 8 illustrates a flow diagram that represents a methodology of analyzing and processing query input by handwriting in accordance with an innovative aspect. At 800, handwriting information is received for processing as a partial query input. The handwriting information also can be stored for later analysis and processing. At 802, recognition analysis and processing is performed on the handwriting information to convert the information to data that can be utilized in query database processing. At 804, the query database is accessed for query information that can be inferred as sufficiently similar to aspects of the partial query to be considered as solutions for completing the query.

At 806, the final query is formulated based on the inferred information as developed by a classifier. At 808, the user is presented with the final query, since the system automatically processes the partial input query and inserts the inferred formulated query for presentation to the user. At 810, at this time, the user can edit any part of the presented query (e.g., characters, terms, phrases, . . . ) to arrive at the desired final query. At 812, the system learns the user edits and reasons about the edits for subsequent processing of another user query. The final complete query is then executed to return search results, as indicated at 814. The system can operate to dynamically track and process user edits or changes to the formulated query, as described above in FIG. 7.

Figure 9:
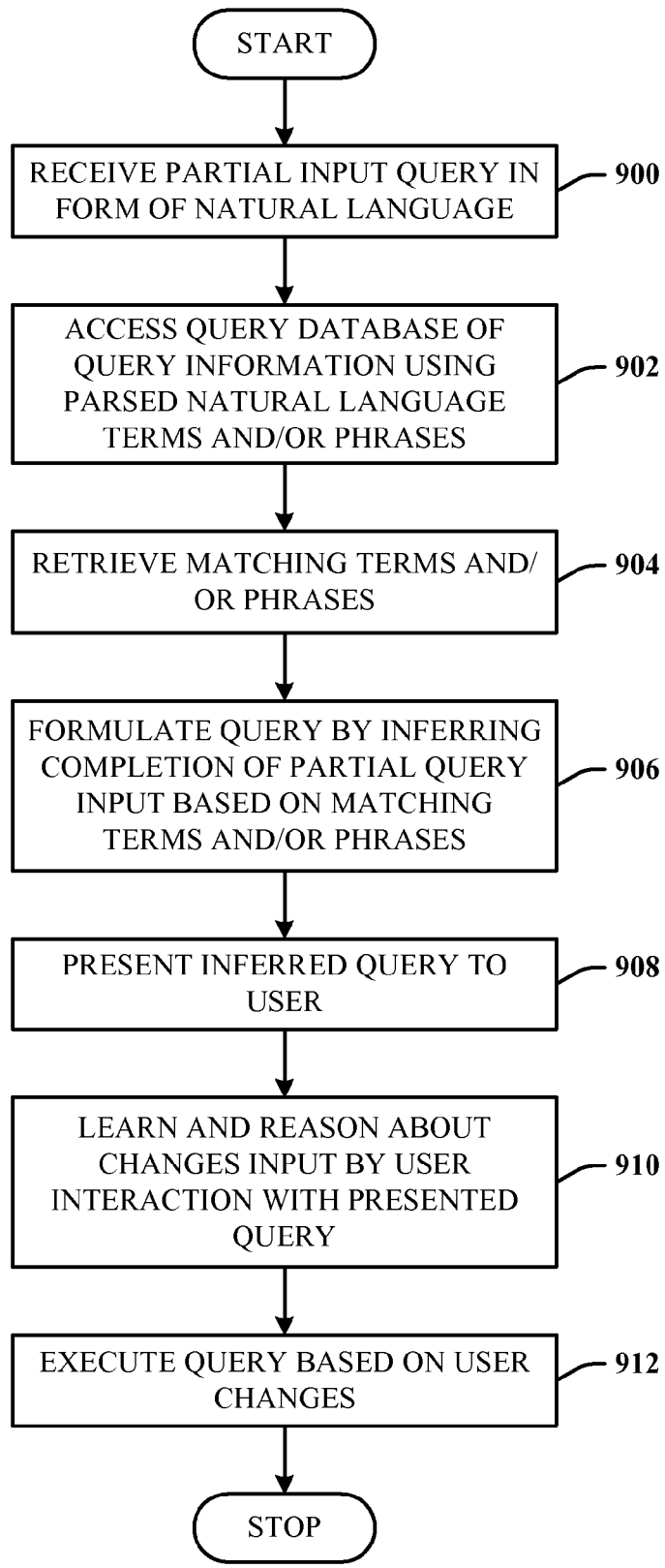
FIG. 9 illustrates a flow diagram that represents a methodology of analyzing and processing a natural language query input in accordance with an innovative aspect.

FIG. 9 illustrates a flow diagram that represents a methodology of analyzing and processing a natural language query input in accordance with an innovative aspect. At 900, natural language data is received for processing as a partial query input. The natural language data also can be stored for later analysis and processing. At 902, the language can be parsed for terms and/or phrases deemed to be important for query database processing. At 904, the query database is accessed for query information that can be inferred as sufficiently similar to aspects of the partial query to be considered as solutions for completing the query.

At 906, the final query is formulated based on the inferred information as developed by a classifier. At 908, the user is presented with the final query, since the system automatically processes the partial input query and inserts the inferred formulated query for presentation to the user. At 910, at this time, the user can edit any part of the presented query (e.g., characters, terms, phrases, . . . ) to arrive at the desired final query and based on which the system learns and reasons about the user edits for subsequent processing of another user query. The final complete query is then executed to return search results, as indicated at 912. As before, the system can operate to dynamically track and process user edits or changes to the formulated query, as described herein.

Figure 10:
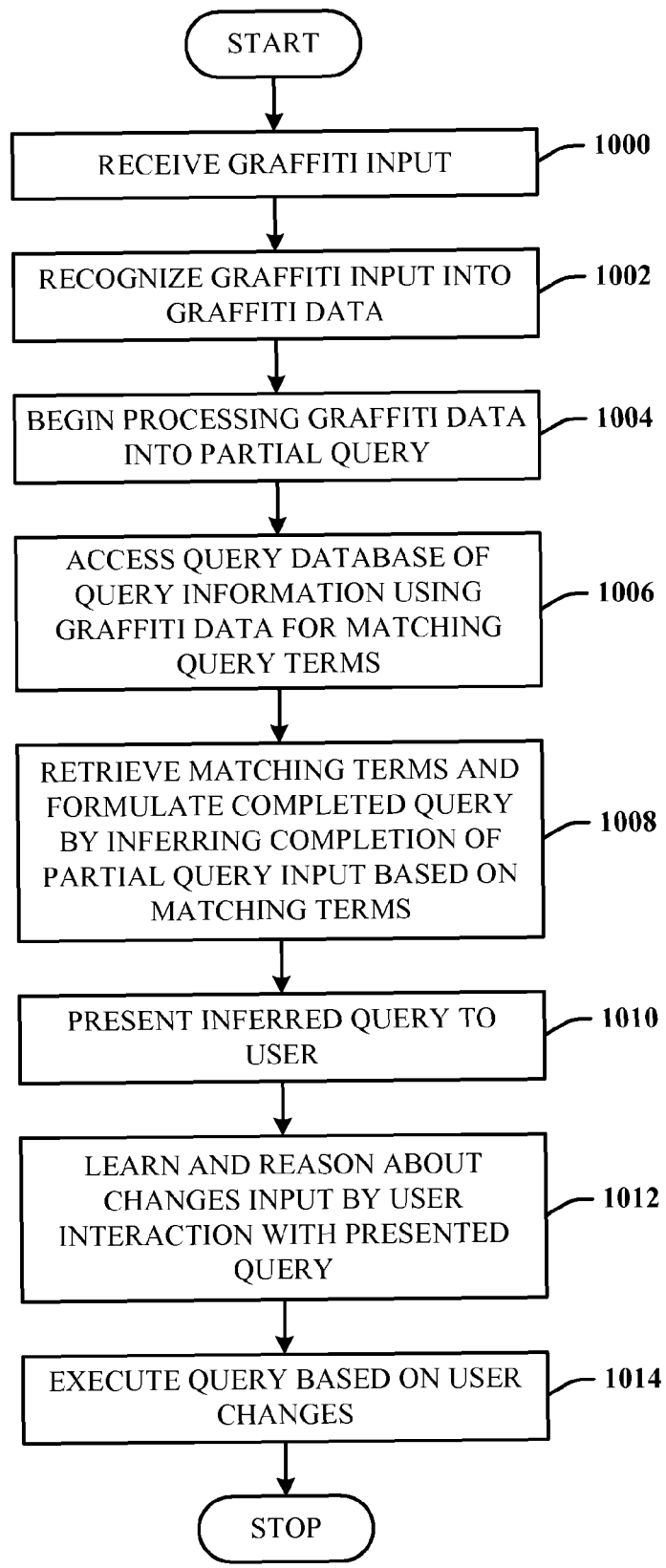
FIG. 10 illustrates a flow diagram of a methodology of analyzing and processing query input based on graffiti indicia in accordance with an innovative aspect.

FIG. 10 illustrates a flow diagram of a methodology of analyzing and processing query input based on graffiti indicia in accordance with an innovative aspect. At 1000, graffiti information is received for processing as a partial query input. The graffiti information also can be stored for later analysis and processing. At 1002, graffiti recognition analysis and processing is performed on the graffiti information for conversion to data that can be utilized in query database processing. At 1004, the system beings processing the graffiti data into the query, which will be a partial query until the query is completely generated.

At 1006, the query database is accessed for query information using the graffiti data and from which forms the basis for inference processing by the classifier to obtain sufficiently similar query information, which can be considered as solutions for completing the partial query. At 1008, the similar information is retrieved and the final query formulated based on the inferred information as developed by the classifier. At 1010, the user is presented with the final query, since the system automatically processes the partial input query and inserts the inferred formulated query for presentation to the user. At 1012, the user can edit any part of the presented query (e.g., characters, terms, phrases, . . . ) to arrive at the desired final query and based on which the system learns and reasons about the user edits for subsequent processing of another user query. The final complete query is then executed to return search results, as indicated at 1014. As before, the system can operate to dynamically track and process user edits or changes to the formulated query, as described herein.

Figure 11:
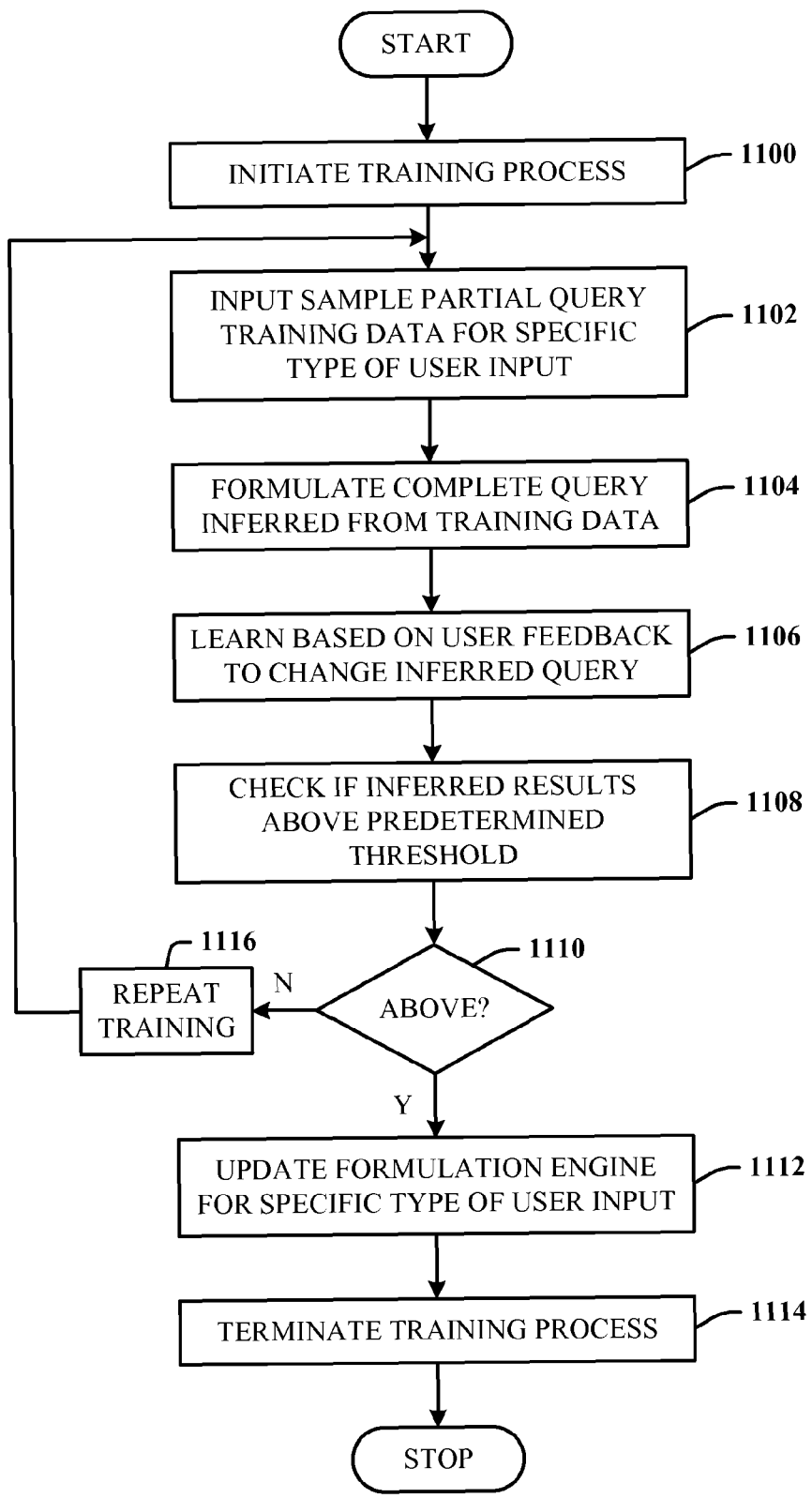
FIG. 11 illustrates a methodology of fine-tuning the system in accordance with an aspect.

FIG. 11 illustrates a methodology of fine-tuning the system in accordance with an aspect. At 1100, a training (or fine-tuning) process is initiated. At 1102, sample partial query training data is input for a specific type of input. For example, to improve on the voice recognition aspects, the user will speak into the system or cause to be input recordings of user utterances. Similarly, handwriting information is input to improve on system aspects related to handwriting recognition, and so on. Based thereon, a complete query is formulated as inferred from query information stored in a query datastore (e.g., chip memory, hard drive, . . . ), as indicated at 1104. At 1106, based on what edits or changes the user may make to the final query, the system learns and stores this user interaction information.

The system can further analyze the user changes to arrive at a value which provides a quantitative measure as to the success or failure (or degree of success or failure) of the system to meet the intended search goal of the user. Given this capability, the user can then assign a predetermined threshold value for comparison. Accordingly, at 1108, the system checks whether the inferred results are associated with a value that exceeds the threshold value. If so, at 1110, flow is to 1112 to update the formulation engine and related system entities for the specific partial query input and formulated complete query output. At 1114, the training (or fine-tuning) process is then terminated. On the other hand, at 1110, if the threshold is not met, flow is to 1116 to repeat the training process by receiving and processing another sample partial query input at 1102.

Figure 12:
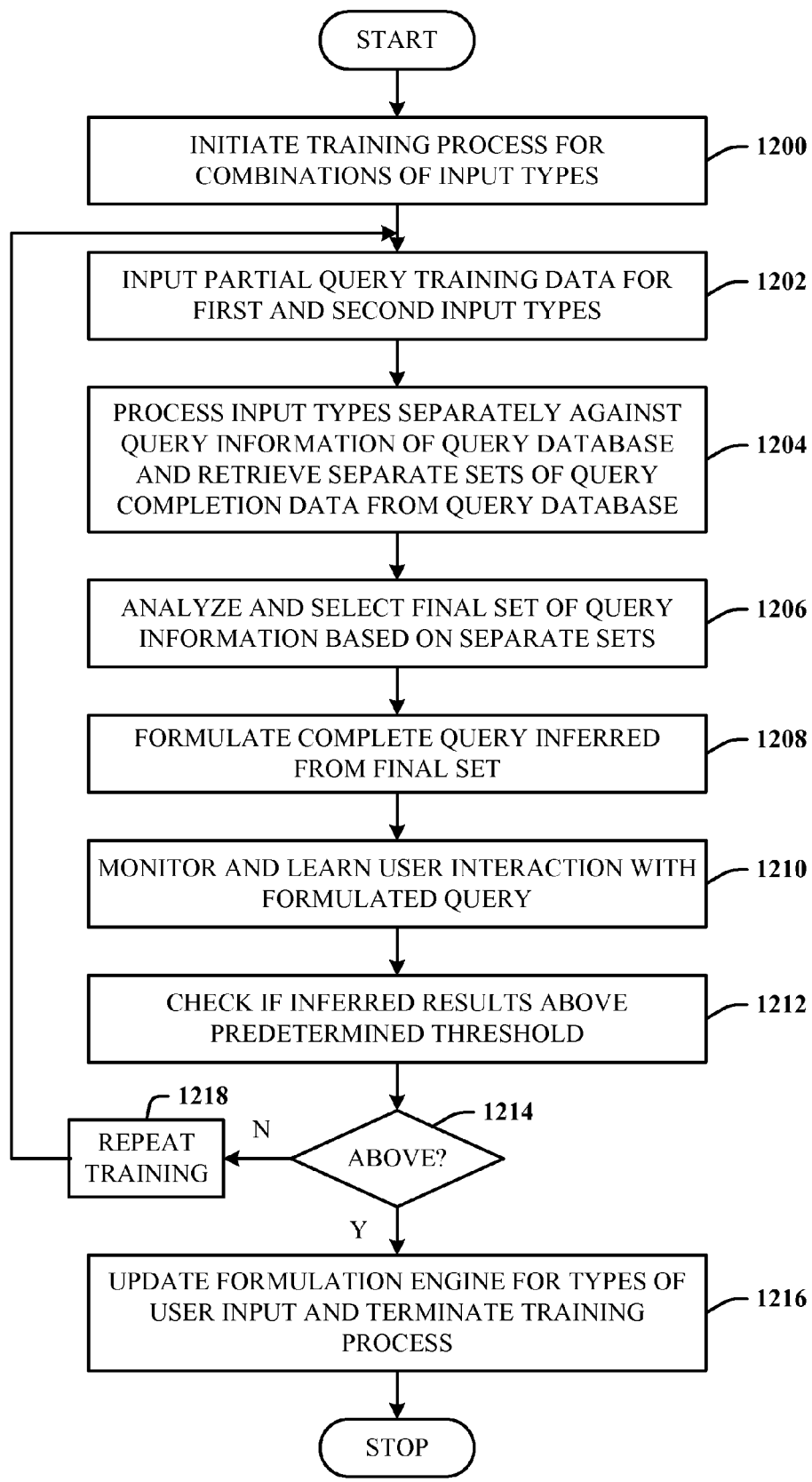
FIG. 12 illustrates a methodology of fine-tuning the system by processing combinations of query input types in accordance with another innovative aspect.

FIG. 12 illustrates a methodology of fine-tuning the system by processing combinations of query input types in accordance with another innovative aspect. At 1200, a training (or fine-tuning) process is initiated. At 1202, sample partial query training data is input for two or more specific types of inputs. For example, to improve on the searching that previously employed a combination of voice recognition and textual input, the user will speak into the system or cause to be input recordings of user utterances while inputting text. Similarly, handwriting information in combination with voice recognition can be input to improve on system recognition and processing of utterances with handwriting input. In yet another example, pose information related to camera image or video representations of the user can be processed as further means in combination with voice and text input. Accordingly, separate sets of query information can be retrieved for each of the different input types.

At 1206, the separate sets of query information are analyzed, and a final set of inferred query information is obtained. At 1208, based on all of these various inputs and corresponding sets of inferred query information, a completed query is formulated. At 1210, the system monitors and learns about user changes to the inferred formulation. The system can further analyze the user changes to arrive at a value which provides a quantitative measure as to the success or failure (or degree of success or failure) of the system to meet the intended search goal of the user. Given this capability, the user can then assign a predetermined threshold value for comparison. Accordingly, at 1212, the system checks whether the inferred results are associated with a value that exceeds the threshold value. If so, at 1214, flow is to 1216 to update the formulation engine and related system entities for the specific partial query input and formulated complete query output, and terminate the training (or fine-tuning) process. On the other hand, at 1214, if the threshold is not met, flow is to 1218 to repeat the training process by receiving and processing another sample partial query input at 1202.

Figure 13:
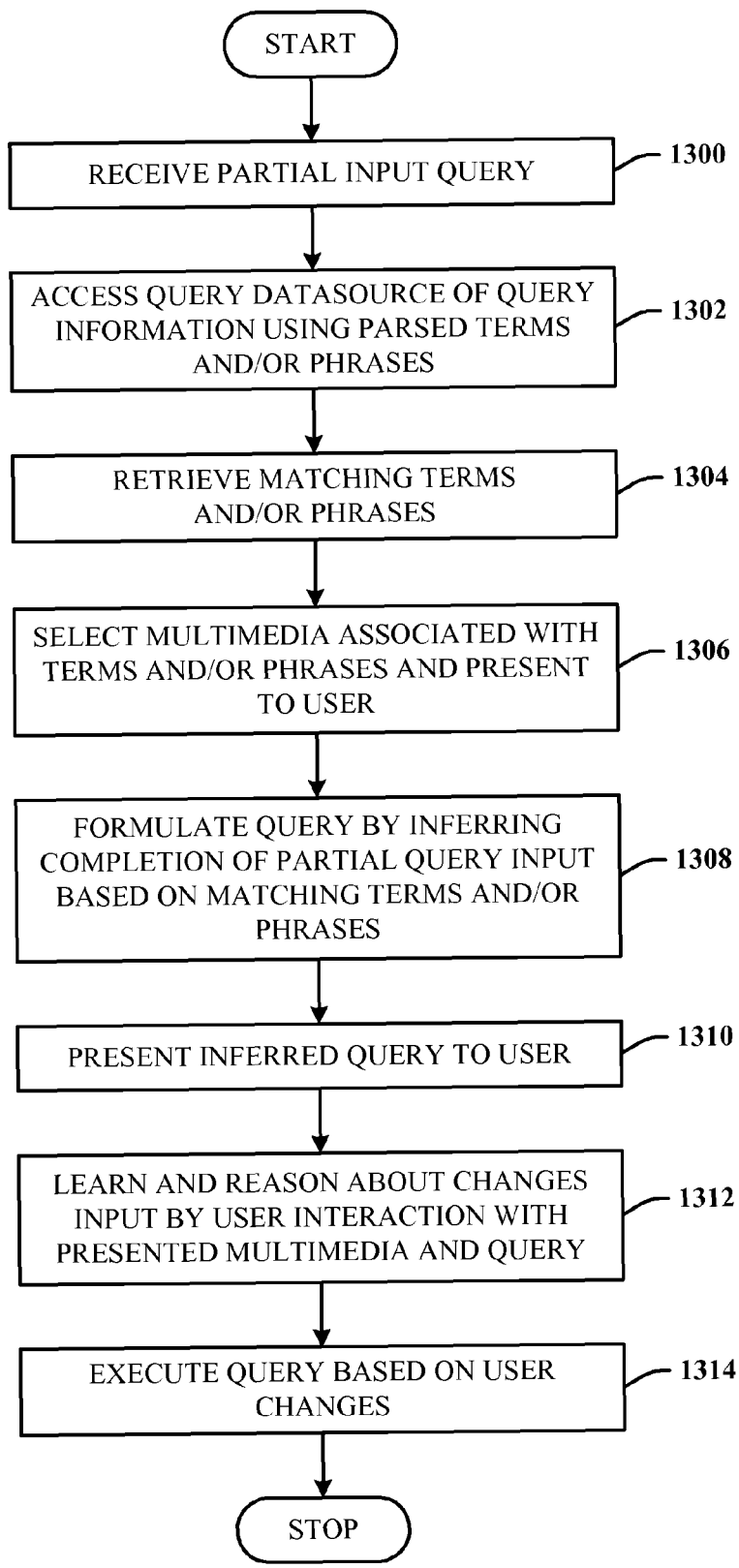
FIG. 13 illustrates a flow diagram of a methodology of processing multimedia in association with a partial input query in accordance with another aspect.

FIG. 13 illustrates a flow diagram of a methodology of processing multimedia in association with a partial input query in accordance with another aspect. At 1300, a partial input query is received. At 1302, a datasource is accessed for query information that is inferred to be a solution for completing the partial query based on character sets, parsed terms, phrases, audio data, voice data, image data (e.g., graffiti and images), video data, and so on. At 1304, terms are inferred to be suitable for completing the partial input query. At 1306, multimedia associated with the retrieved characters, terms and/or phrases is retrieved. At 1306, some or all of the retrieved multimedia is selected and presented to the user. At 1308, the completed query is formulated based on the matching characters, terms, and/or phrases. At 1310, the inferred formulated query is presented to the user. At 1312, the systems learns and reasons about user edits or changes to the formulated query and/or presented multimedia, or lack of any edits or changes made. At 1314, the final query is executed to return search results.

Figure 14:
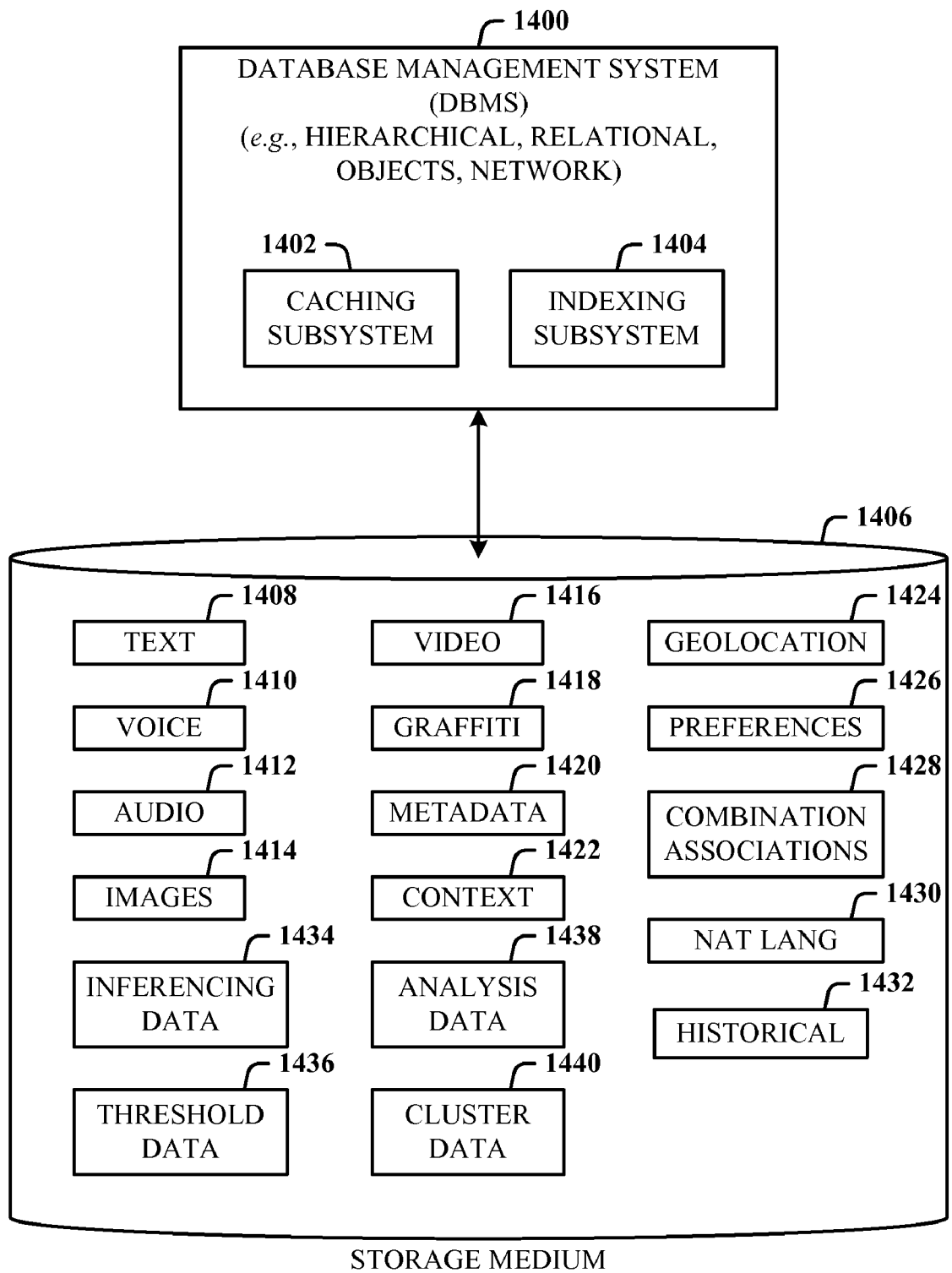
FIG. 14 illustrates a database management system that facilitates learning and indexing query input information for partial query processing in accordance with an innovative aspect.

FIG. 14 illustrates a database management system (DBMS) 1400 that facilitates learning and indexing query input information for partial query processing in accordance with an innovative aspect. The DBMS 1400 can support hierarchical, relation, network and object-based storage systems. The DBMS 1400 can include a caching subsystem 1402 for caching most likely and most recently used data, for example, to facilitate fast processing of at least partial queries. An indexing subsystem 1404 facilitates indexing a wide variety of data and information for retrieval, analysis and processing from a storage medium 1406.

Stored on the medium 1406 can be text information 1408 related to text data (e.g., alphanumeric characters, Unicode characters, terms, phrases), voice information 1410 related to raw voice signals and recognized voice data, audio information 1412 associated with raw audio signals and processed audio signals into data, and image information 1414 associated with raw images and processed images. Additionally, stored on the medium 1406 can be video information 1416 related to video clips and processed video data, graffiti information 1418 associated with strokes and other related input indicia, metadata information 1420 related to attributes, properties, etc., of any of the data stored in the storage medium 1406, context information 1422 associated with user context (e.g., within a software environment), and geolocation contextual information 1424 related to geographical information of the user.

Preferences information 1426 related to user preferences, default application preferences, etc., can also be stored, as well as combination associations information 1428 related to multiple input types (e.g., songs having both words and audio, voice input and text input, . . . ), and natural language information 1430 associated with natural language input structures and terms, phrases, etc. Historical information 1432 can be stored related to any data that has been gathered in the past, as well as inferencing data 1434 associated with information derived from classifier inference analysis and processing, threshold data 1436 related to setting and processing thresholds for measuring the qualitative aspects of at least the inferencing process. Analysis data 1438 can include the analysis of any of the information mentioned above. Cluster data 1440 is related to clustering that can be employed in support of the inferencing process.

Figure 15:
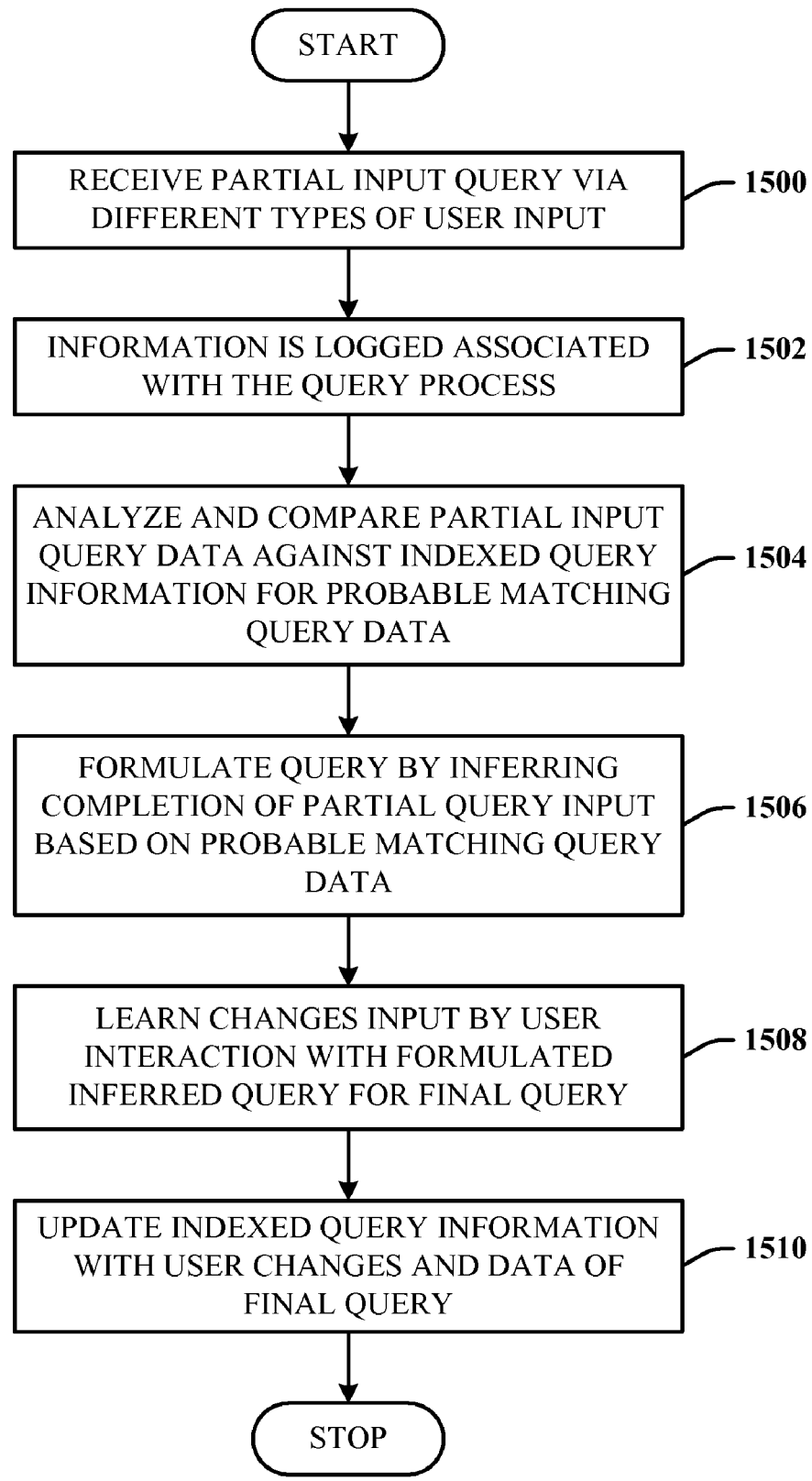
FIG. 15 illustrates a methodology of indexing query information in accordance with an aspect.

FIG. 15 illustrates a methodology of indexing query information in accordance with an aspect. At 1500, the user begins entering a query. As indicated above, the query can be input the form of many different types of data and combinations thereof. As the query entry occurs, the system logs information associated with the query process, as indicated at 1502. For example, context information, geolocation information, user information, temporal information, etc., can all be logged and associated with the query input, and made available for analysis processing to facilitate inferring the information needed for completing the query dynamically and automatically for the user as the query is being entered. At 1504, concurrent with logging, the system further performs classification processing in order to infer query information for completing the partial query being input by the user.

At 1506, the query information is passed to the formulation component for completing the query. At 1508, the system presents the competed query to the user, and logs user interaction data about whether the user chooses to edit or change the final query. This user interaction data can be logged, indexed, and associated with other information. At 1510, the stored information is updated as needed for later processing.

Figure 16:
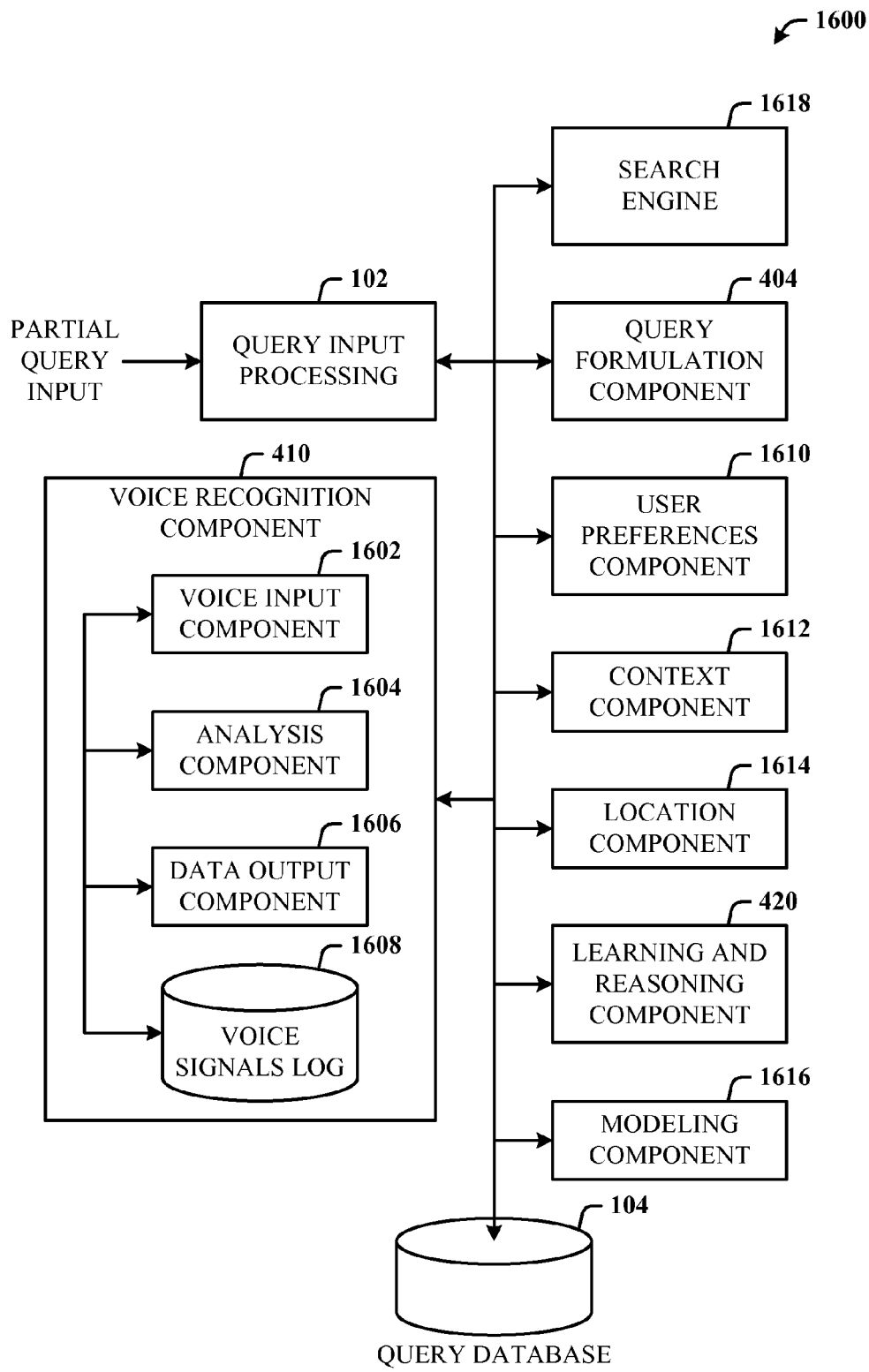
FIG. 16 illustrates a system that facilitates voice-based query processing in accordance with an innovative aspect.

FIG. 16 illustrates a system 1600 that facilitates voice-based query processing in accordance with an innovative aspect. The system 1600 includes the query input processing component 102, the query database 104, and the query formulation component 404 (similar to the formulation engine 106). The voice recognition component 410 is also provided to process partial query inputs in the form of voice input signals. In support thereof, the recognition component 410 can further comprise a voice input component 1602 for receiving voice signals, an analysis component 1604 for analyzing the voice signals and outputting voice data that can further be utilized for query processing. A data output component 1606 facilitates output processing of the voice data and related recognition data (e.g., analysis) to other processes, if needed. For example, both of the voice signals and the voice data can be stored in a voice signals log 1608. The analysis component 1604 of the voice recognition component 410 can provide a confidence value which is an indication of the confidence the system places on converted voice signals relative to the received input voice signals. Confidence values can also be developed based on the inferences made by the classifier. If the inference is associated with a low confidence value, the search results obtained and presented can be lower in ranking. A higher confidence value will result in a higher ranking of the search results.

The system 1600 can further include a user preferences component 1610 for recording user preferences, a context component 1612 for determining user context (e.g., in programs or computing environments), and a location component 1614 for computing user geographic location. The MLR component 420 facilitates classifier processing for inferring query information to complete the partial input query, as well as machine learning and reasoning about query inputs, intermediate processes, final query formulation, and post-search processes, for example. A modeling component 1616 is employed for developing and updating models for voice recognition, graffiti recognition, and other media recognition systems (e.g., image, video, . . . ). The query formulation component 404 outputs the formal query to a search engine 1618 that process the formal query to return search results.

In an alternative implementation, voice recognition processes can be improved. Speech recognizers often make mistakes based on imperfections in receiving the input (e.g., from a garbled or reduced quality input), processing the voice input, and formulating the output. Speech recognition systems can often return "n-best" lists. A voice-activated speech recognition system can return search results for the top three different possible queries, for example. The system could use search result information to distinguish possible queries. In other words, the system can also combine (or process) preliminary search results with recognition results to determine what final search results to show. For example, if the top two recognized results are "wreck a nice beach" and "recognize speech", but there are 1000 results for "recognize speech" and 0 or 2 or 100 results for "wreck a nice beach", then the search engine 1618 can return the results for "recognize speech" rather than "wreck a nice beach".

Showing multiple results based on the top-n queries (e.g., two results for each of three possible interpretations) can be beneficial. This behavior can depend on a confidence output from the analysis component 1604 of the voice recognition component 410 (e.g., if the system is sure of its top result, then only searches based on the top result are returned; but if the system has low confidence in the recognition result, then additional results are returned. The system can also be configured to preserve homonyms (or ambiguities) as appropriate in the query database 104. For example, if a user inputs "Jon Good", the system can return results for "Jon Good", "John Goode", "Jon Goode" and "John Good". These results can optionally be grouped together, and/or there can be integrated options to disambiguate any word or phrase.

The interim processes can be impacted by user preferences, context data, user location, device hardware and/or software capabilities, to name a few. For example, the conversion of received voice signals to machine data can be impacted by the desired criteria. If the received voice signals align with a voice recognition model which indicates the voice signals are more closely matched with a Texas drawl, and that can be confirmed by location data, the data accessed from the query database 104 can be more closely related to terms, phrases, etc., typically associated with Texas and the speech mannerisms for that area. Additionally, based on user location, the data in the query database 104 against which a spoken query is processed can be more focused thereby improving the conversion, query formulation, and results.

Based on the user location (e.g., as determined by GPS), the translated input voice signals can be processed against data of the query database related to businesses, event, attractions, etc., associated with that geographic location. For example, if the user is conducting a voice-initiated search at a location associated with a sports stadium, and it can further be ascertained that the sporting event is a baseball game between two known teams, the search query formulation can be more accurately developed based on data that is more likely than not to be associated with the sporting event, weather, team data, team rankings, and so on.

Figure 17:
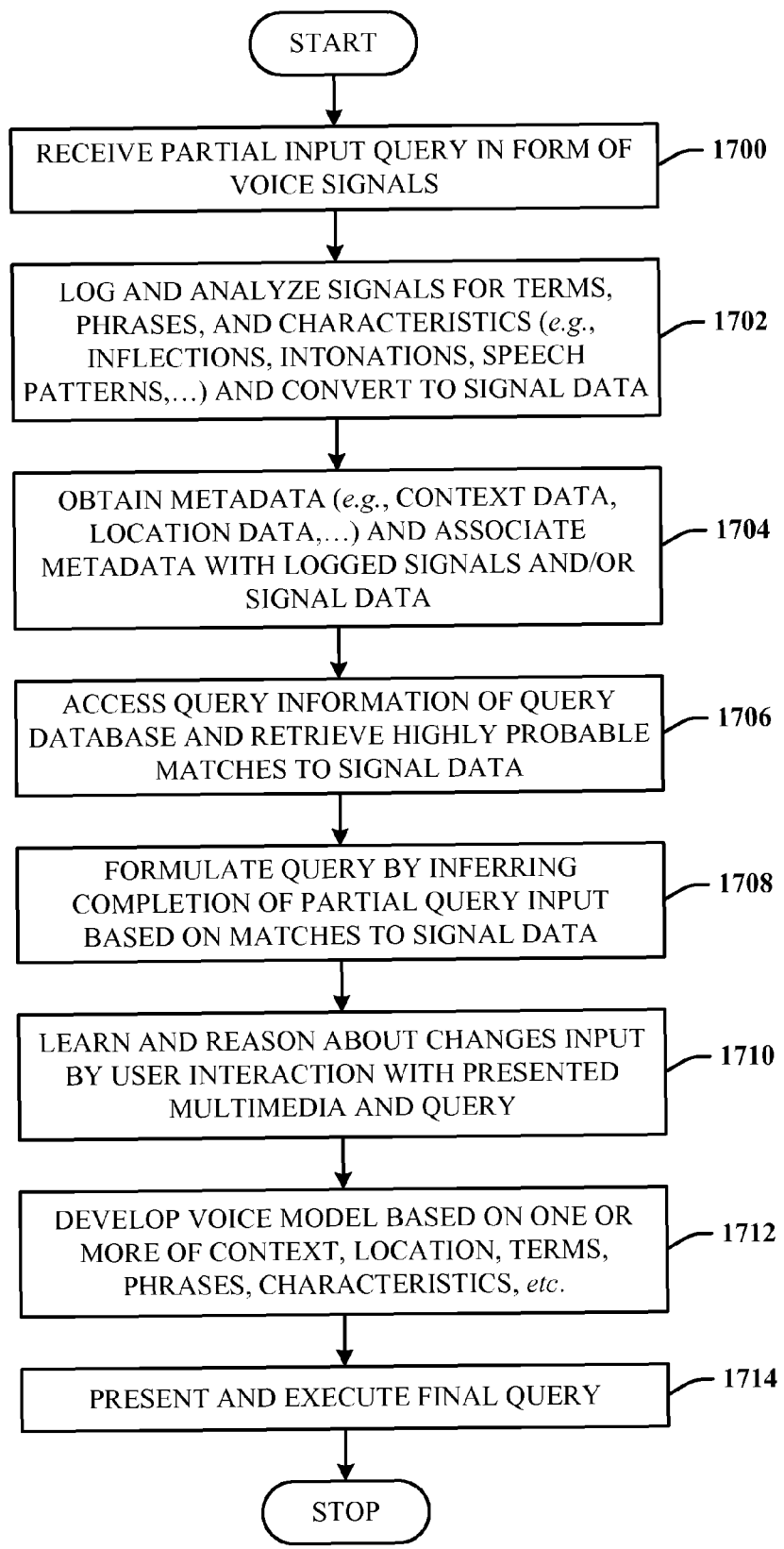
FIG. 17 illustrates a flow diagram of a methodology of voice signal processing for query inferencing in accordance with the subject disclosure.

FIG. 17 illustrates a flow diagram of a methodology of voice signal processing for query inferencing in accordance with the disclosed aspects. At 1700, a partial input query is received in the form of voice signals. At 1702, the signals are logged and analyzed for terms, phrases and/or characteristics (e.g., voice inflections, intonations, speech patterns, . . . ) and converted into signal data. At 1704, metadata is obtained (e.g., context data, location data, . . . ) and associated with logged voice signals and/or voice data. At 1706, query information is accessed from the query database and processed to infer information for completing the partial input query based on matches to the signal data. At 1708, the compete query is formulated based on the inference data. At 1710, the system learns and reasons about changes made (or not made) by the user with presented multimedia and the query. At 1712, a voice model can be generated based on one or more of context, location, terms, phrases, speech characteristics, etc. At 1714, the resulting completed query is presented and executed to return search results.

Figure 18:
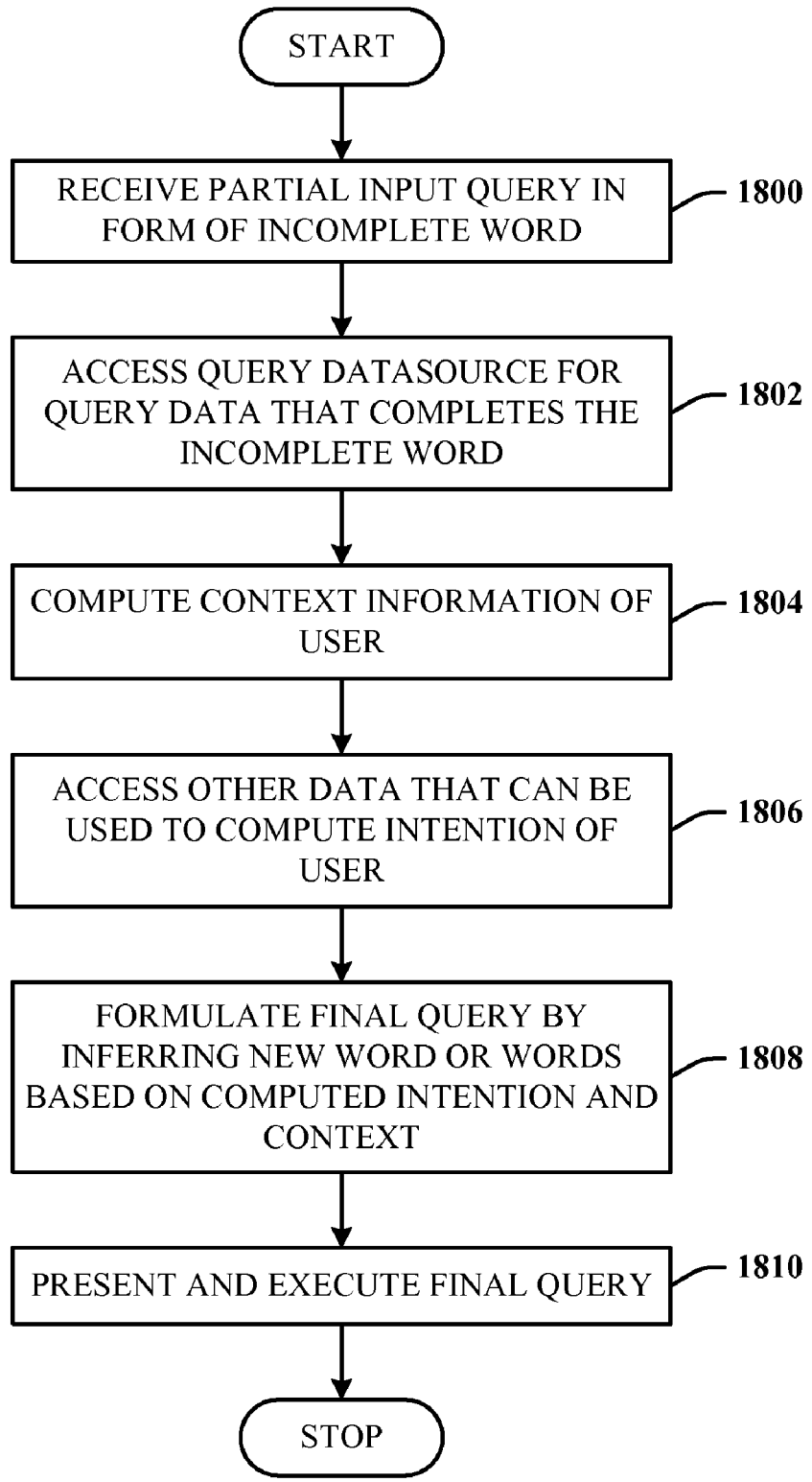
FIG. 18 illustrates a methodology of inferred query completion using words different than completed words in a partial input query.

FIG. 18 illustrates a methodology of inferred query completion using words different than completed words in a partial input query. At 1800, a partial input query is received. At 1802, a query datasource is accessed for query data that can be used to complete an incomplete word of the partial input query. The system can then access information that helps to focus the search to data associated with the intended search goals of the user. For example, at 1804, the system accesses context information of the user. This context information can include the software environment in which the user is currently active (e.g., a programming language, spreadsheet, game, . . . ). At 1806, other data can also be accessed to aid the system in determining the user's intended search goals. At 1808, the final query is formulated by inferring a new word or words based on the computed context and user intentions. At 1810, the final formulated query is then presented to the user and executed to return search results.

It is to be appreciated that various mechanisms for weighting query information can be employed. In one implementation, the bigger the word, the more points assigned to the word. Thus, during the inferencing process, selection of a preferred word between several equally ranked words can be resolved by the points system. In yet another implementation, vendors can pay for weighting options such that given a choice to make by the classifier, the vendor paying the most will have their query information utilized in completing the partial query input, thereby increasing the likelihood that the search will be conducted to bring up their vendor site and related products/services.

In another aspect, syntactical analysis of the partial query can be performed as a means to further resolve the intended goals of the search. For example, given one or more query terms, the system can infer based on a recognized way in which words and symbols are put together that the user intended the syntactical information to infer a resulting phrase. The syntactical analysis can be employed for common language usage (e.g., English, German, . . . ) as well as for more focused environments such as in programming language applications where syntax applies to different terms and symbols. For example, if the partial query includes common terms and symbols found in a C++ document, the system can access query information related to the C++ language, and more specifically, to the terms and symbols more frequently used by the user, to complete the partial user query.

Figure 19:
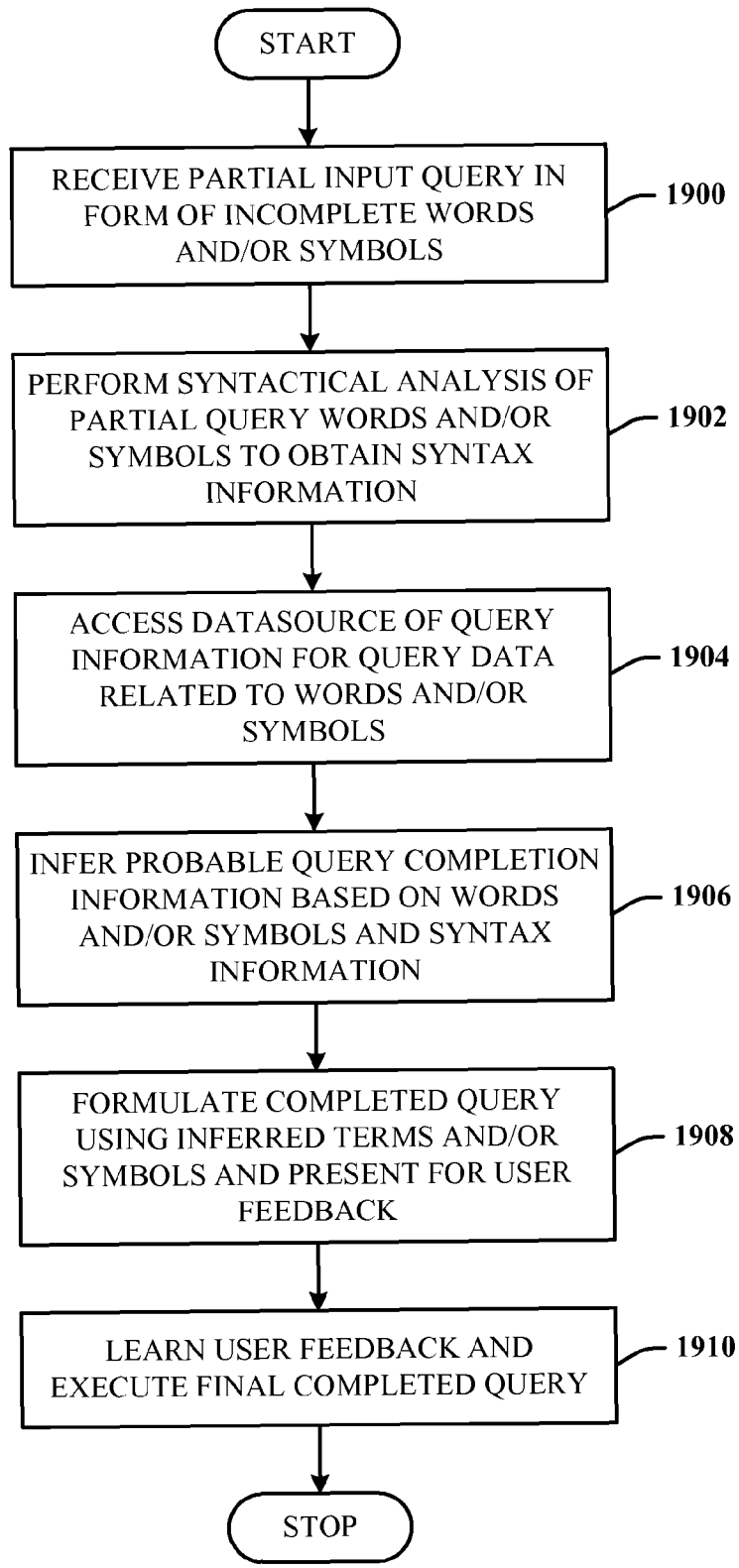
FIG. 19 illustrates a methodology of performing syntactical processing in accordance with another aspect.

FIG. 19 illustrates a methodology of performing syntactical processing in accordance with another aspect. At 1900, a partial query of words and/or symbols is received. At 1902, syntactical analysis is performed to determine the syntax information of the words and/or symbols by analyzing the ordering and structure of the words and/or symbols. At 1904, a datasource of query information is accessed for query data related to the words and/or symbols. At 1906, probable query completion information in the form of words and/or symbols is inferred. At 1908, the completed query is formulated using the inferred terms and/or symbols, and present to the user for feedback. At 1910, the system learns from user feedback, and executes the final completed query to return search results.

Figure 20:
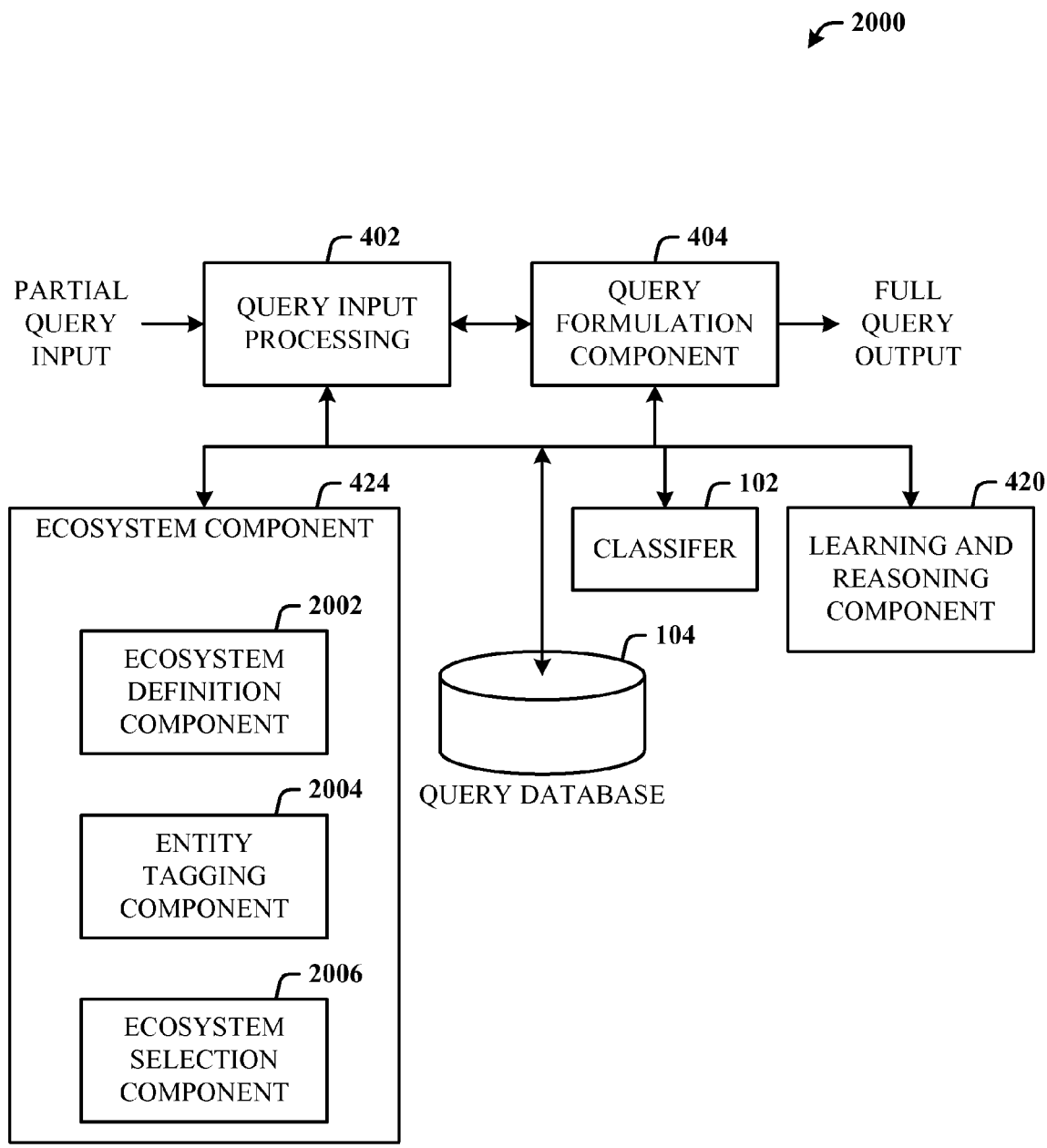
FIG. 20 illustrates an ecosystem mark-up system for tagging selected aspects for searching.

FIG. 20 illustrates an ecosystem mark-up system 2000 for tagging selected aspects for searching. The system 2000 includes the ecosystem component 424 of FIG. 4 for processing related functions. For example, an ecosystem definition component 2002 can be employed to facilitate defining the scope of a search. Searchable entities can include characters, symbols, graphical indicia, terms, words, phrases, documents, objects, and code.

At an application level, for example, the search can be limited to a single application and any data, code, objects, etc., related to that application or a single website environment having many different applications. Alternatively, given a suite of applications, the ecosystem can be limited to all applications in that suite. In yet another implementation, the ecosystem can be selectively limited to all spreadsheet applications (where there are two or more different spreadsheet applications). Such an ecosystem can then be defined over a network of computers each running different types of operating system (OS), for example, the network comprising a first computer of a first OS of a first vendor, a second computer running an OS of a second vendor, and a third computer running an OS of a third vendor.

In a more restricted ecosystem, the developer marks the content of a website, since the developer knows all content thereof. Accordingly, the content can be tagged or marked such that the search processes the tags or marks, rather than the content. In an alternative implementation, however, the tags can be processed first, followed by a content search, if initial tag-only results are deemed inadequate.

An entity tagging component 2002 of the component 424 facilitates marking or tagging selected entities. The user can perform the marking manually by selectively marking each entity as it is being developed or during development. Alternatively, or in combination therewith, a search can be performed in accordance with the disclosed architecture thereby allowing the user to tag desired search results. Moreover, as the system learns and reasons about what the user intentions and goals are, the quality of the searches will improve allowing a more comprehensive and exhaustive examination of available entities for tagging. Accordingly, the system 2000 can employ components previously described. For example, in support of searching and tagging returned results, the query input processing component 402, and query formulation component 404 can be utilized, as well as the MLR component 420, the classifier 102 (now shown external to the MLR), and the query database 104, for storing information related to at least ecosystem selection, definition and tagging.

An ecosystem selection component 2006 facilitates selecting an ecosystem for search processing. In other words, the component 2006 allows the user to select all computers having a particular application suite, all applications of a given computer system, all spreadsheet applications of multiple different computing systems running different OS's, and so on, based on the tagged entities. In another example, a developer can search and cause to be surfaced aspects of a DBMS—not only the data. In another example, a search box can be exposed on a website page that allows the searcher to shrink (or limit) the domain to the smallest number of web pages to search.

Figure 21:
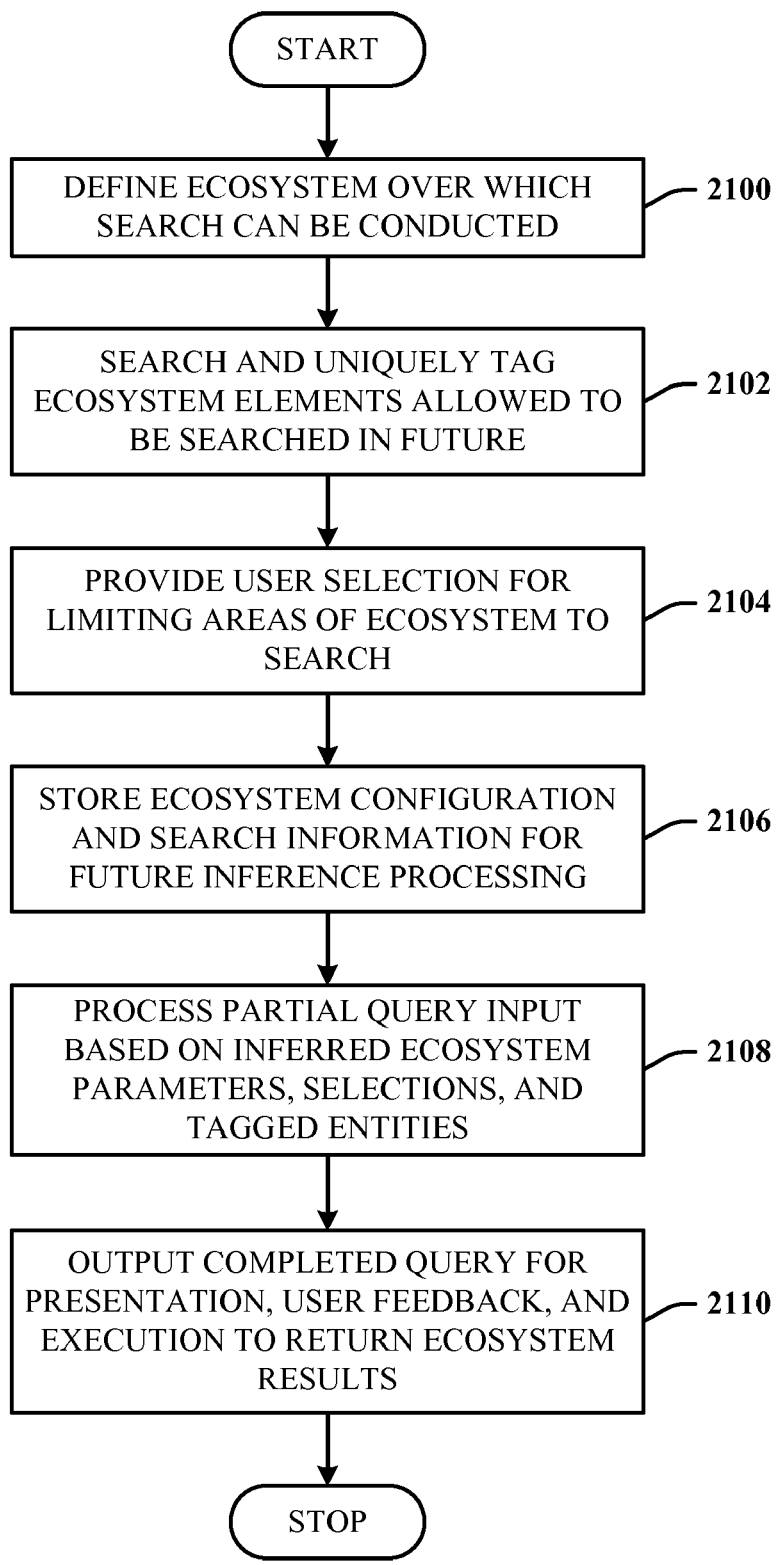
FIG. 21 illustrates a flow diagram of a methodology of marking a defined ecosystem such that searching can be performed efficiently within that ecosystem.

FIG. 21 illustrates a flow diagram of a methodology of marking a defined ecosystem such that searching can be performed efficiently within that ecosystem. At 2100, the user defines the ecosystem (or environment) for the search. At 2102, the user initiates a partial query search and tags the returned ecosystem elements (or entities) with information that uniquely identifies the entity (e.g., document, code, application, . . . ) for future searches. At 2104, user-selection capability is provided for selecting aspects of the ecosystem for searching. The selection process can further be facilitated by presenting a menu (e.g., drop-down) of options to the user. At 2106, the system stores ecosystem configuration and search information that can be used for future ecosystem inference processing. At 2108, a partial query input is processed based on inferred ecosystem parameters, selections, and/or tagged entities. At 2110, a completed formal query is output for presentation, user feedback, and execution to return results of the selected ecosystem.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 22:
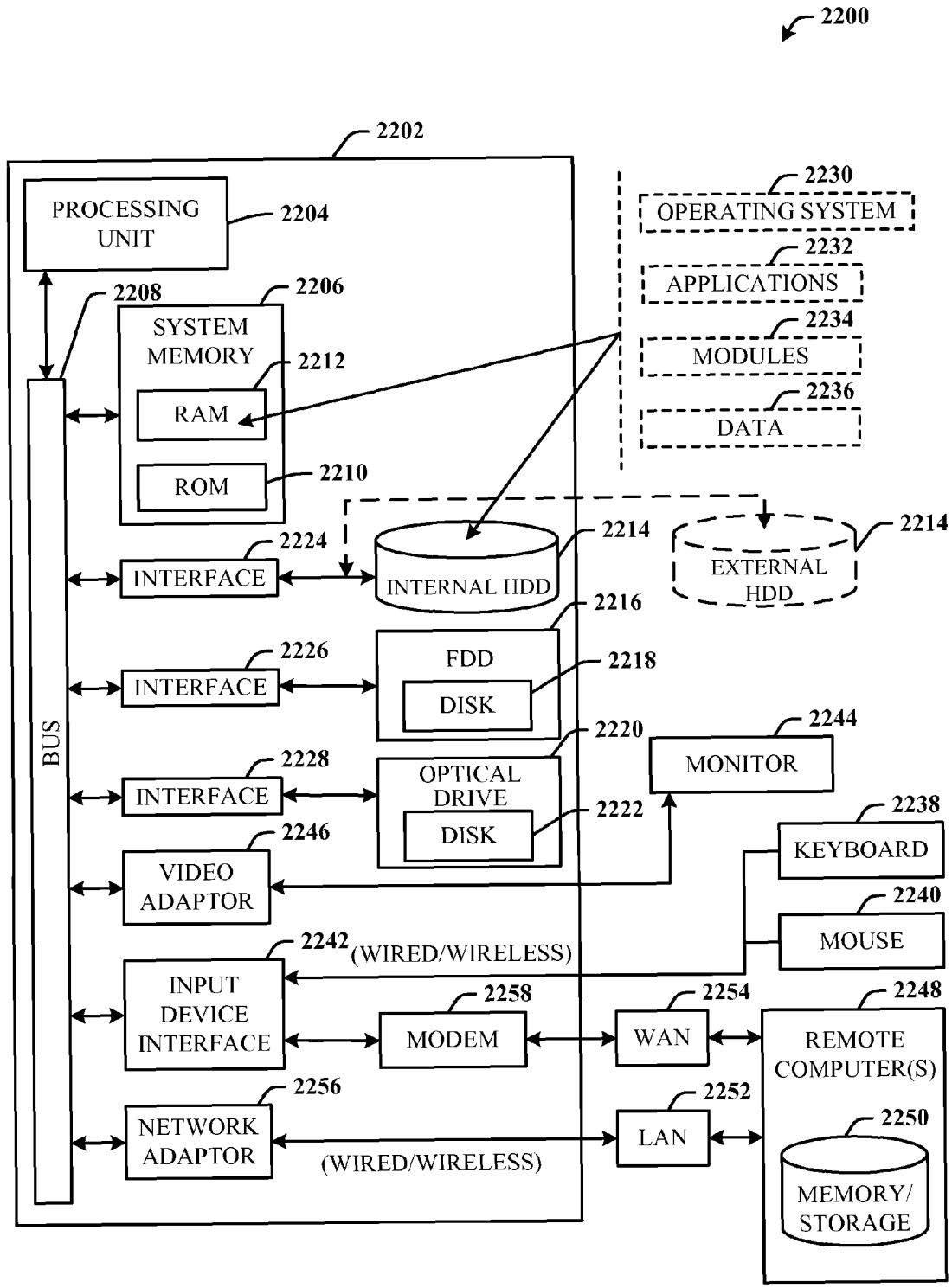
FIG. 22 illustrates a block diagram of a computer operable to execute the disclosed inference-based query completion architecture.

Referring now to FIG. 22, there is illustrated a block diagram of a computer operable to execute the disclosed inference-based query completion architecture. In order to provide additional context for various aspects thereof, FIG. 22 and the following discussion are intended to provide a brief, general description of a suitable computing environment 2200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available storage media device that can be accessed by the computer and includes both volatile and non-volatile media, removable and non-removable media for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, storage device which can be used to store the desired information and which can be accessed by the computer.

With reference again to FIG. 22, the exemplary environment 2200 for implementing various aspects includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures may also be employed as the processing unit 2204.

The system bus 2208 can be any of several types of bus structure that may further interconnect to a memory bus (with or without a memory controller), a peripheral bus, and a local bus using any of a variety of commercially available bus architectures. The system memory 2206 includes read-only memory (ROM) 2210 and random access memory (RAM) 2212. A basic input/output system (BIOS) is stored in a non-volatile memory 2210 such as ROM, EPROM, EEPROM, which BIOS contains the basic routines that help to transfer information between elements within the computer 2202, such as during start-up. The RAM 2212 can also include a high-speed RAM such as static RAM for caching data.

The computer 2202 further includes an internal hard disk drive (HDD) 2214 (e.g., EIDE, SATA), which internal hard disk drive 2214 may also be configured for external use in a suitable chassis (not shown), a magnetic floppy disk drive (FDD) 2216, (e.g., to read from or write to a removable diskette 2218) and an optical disk drive 2220, (e.g., reading a CD-ROM disk 2222 or, to read from or write to other high capacity optical media such as the DVD). The hard disk drive 2214, magnetic disk drive 2216 and optical disk drive 2220 can be connected to the system bus 2208 by a hard disk drive interface 2224, a magnetic disk drive interface 2226 and an optical drive interface 2228, respectively. The interface 2224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media storage devices which are readable by a computer, such as zip drives, magnetic cassettes, flash memory cards, cartridges, and the like, may also be used in the exemplary operating environment to store computer-executable instructions for performing the methods of the disclosed innovation.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. It is to be appreciated that the innovation can be implemented with various commercially available operating systems or combinations of operating systems.

A user can enter commands and information into the computer 2202 through one or more wired/wireless input devices, e.g., a keyboard 2238 and a pointing device, such as a mouse 2240. Other input devices (not shown) may include a microphone, an IR remote control, a joystick, a game pad, a stylus pen, touch screen, or the like. These and other input devices are often connected to the processing unit 2204 through an input device interface 2242 that is coupled to the system bus 2208, but can be connected by other interfaces, such as a parallel port, an IEEE 1394 serial port, a game port, a USB port, an IR interface, etc.

A monitor 2244 or other type of display device is also connected to the system bus 2208 via an interface, such as a video adapter 2246. In addition to the monitor 2244, a computer typically includes other peripheral output devices (not shown), such as speakers, printers, etc.

The computer 2202 may operate in a networked environment using logical connections via wired and/or wireless communications to one or more remote computers, such as a remote computer(s) 2248. The remote computer(s) 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2250 is illustrated. The logical connections depicted include wired/wireless connectivity to a local area network (LAN) 2252 and/or larger networks, e.g., a wide area network (WAN) 2254. Such LAN and WAN networking environments are commonplace in offices and companies, and facilitate enterprise-wide computer networks, such as intranets, all of which may connect to a global communications network, e.g., the Internet.

When used in a LAN networking environment, the computer 2202 is connected to the local network 2252 through a wired and/or wireless communication network interface or adapter 2256. The adaptor 2256 may facilitate wired or wireless communication to the LAN 2252, which may also include a wireless access point disposed thereon for communicating with the wireless adaptor 2256.

When used in a WAN networking environment, the computer 2202 can include a modem 2258, or is connected to a communications server on the WAN 2254, or has other means for establishing communications over the WAN 2254, such as by way of the Internet. The modem 2258, which can be internal or external and a wired or wireless device, is connected to the system bus 2208 via the serial port interface 2242. In a networked environment, program modules depicted relative to the computer 2202, or portions thereof, can be stored in the remote memory/storage device 2250. It will be appreciated that the network connections shown are exemplary and other means of establishing a communications link between the computers can be used.

The computer 2202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 23:
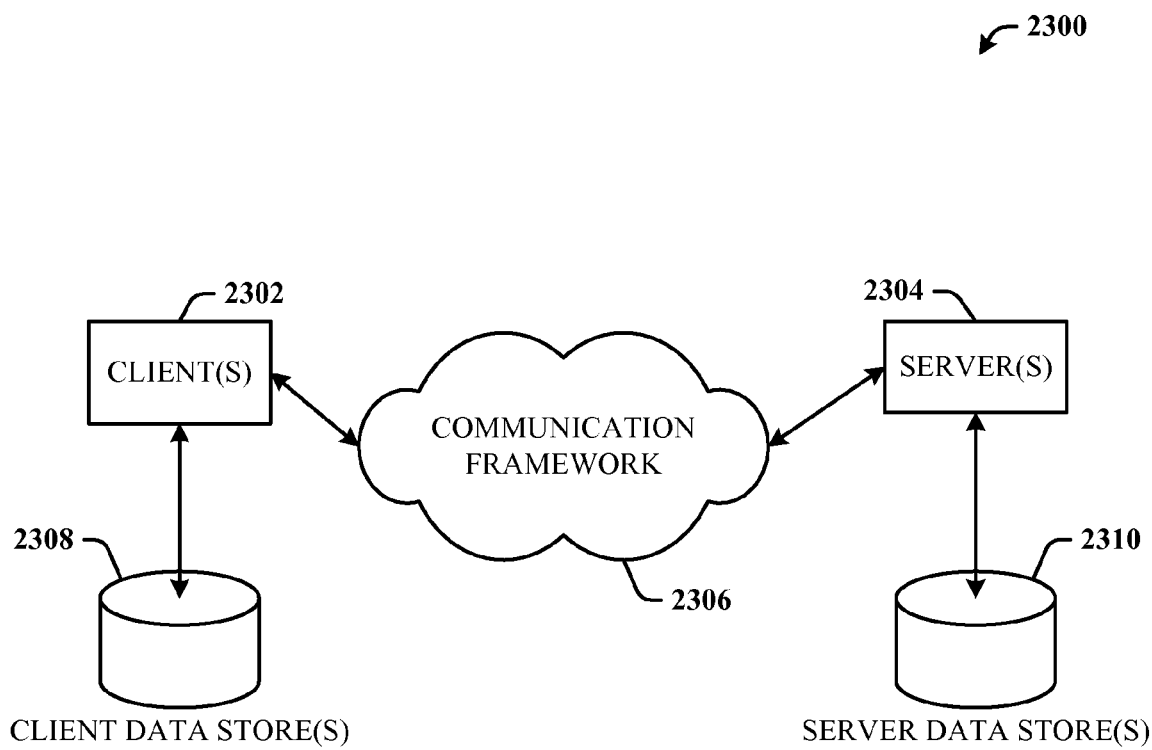
FIG. 23 illustrates a schematic block diagram of an exemplary computing environment for processing the inference-based query completion architecture in accordance with another aspect.

Referring now to FIG. 23, there is illustrated a schematic block diagram of an exemplary computing environment 2300 for processing the inference-based query completion architecture in accordance with another aspect. The system 2300 includes one or more client(s) 2302. The client(s) 2302 can be hardware and/or software (e.g., threads, processes, computing devices). The client(s) 2302 can house cookie(s) and/or associated contextual information by employing the subject innovation, for example.

The system 2300 also includes one or more server(s) 2304. The server(s) 2304 can also be hardware and/or software (e.g., threads, processes, computing devices). The servers 2304 can house threads to perform transformations by employing the disclosed embodiments, for example. One possible communication between a client 2302 and a server 2304 can be in the form of a data packet adapted to be transmitted between two or more computer processes. The data packet may include a cookie and/or associated contextual information, for example. The system 2300 includes a communication framework 2306 (e.g., a global communication network such as the Internet) that can be employed to facilitate communications between the client(s) 2302 and the server(s) 2304.

Communications can be facilitated via a wired (including optical fiber) and/or wireless technology. The client(s) 2302 are operatively connected to one or more client data store(s) 2308 that can be employed to store information local to the client(s) 2302 (e.g., cookie(s) and/or associated contextual information). Similarly, the server(s) 2304 are operatively connected to one or more server data store(s) 2310 that can be employed to store information local to the servers 2304.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

What is claimed is:

1. A computer-implemented system comprising:
one or more processors;
a recognition component that is executable by the one or more processors to receive a partial query input as voice signals of a user with at least one other sensed input type comprising text, image or audio;
a classifier component, executable by the one or more processors, that processes the partial query input and infers in real-time multiple different search goals based on the partial query input by accessing one or more query databases that store query information and from which similar or matching character sets, terms or phrases are derived for generating at least one complete query, the classifier comprising a support vector machine to find a hyperspace in a space of possible inputs to distinguish triggering input events from non-triggering input events, the classifier explicitly trained using generic training data and implicitly trained by observing user behavior;
a query formulation component, executable by the one or more processors, that generates the at least one complete query based on the multiple different search goals; and
a search engine, executable by the one or more processors, that receives the at least one complete query, presents the at least one complete query to the user for editing, and processes the at least one complete query to return search results for each of the at least one complete query, the search results based on a confidence value output by the voice recognition component indicating the confidence of converted voice signals relative to the partial query input as voice signals of the user.

2. The system of claim 1, wherein the search engine processes output results of the voice recognition component and preliminary search results to arrive at the search results.

3. The system of claim 1, wherein the search engine processes the multiple different search goals to return a set of search results for each different search goal.

4. The system of claim 1, further comprising a context component that generates context information related to a software environment in which the user is currently active, the context information employed by the classifier to infer the multiple different search goals.

5. The system of claim 1, further comprising a location component that computes geographic location data of the user and which location data the query formulation component processes to generate the at least one complete query.

6. The system of claim 1, wherein the classifier infers the multiple different search goals based on the partial query input as voice signals of the user and at least one other sensed input type.

7. The system of claim 1, further comprising a machine learning and reasoning component that learns and reasons about user interaction with the at least one complete query and ranks the search results based on the user interaction.

8. The system of claim 1, further comprising a syntactical processing component that receives recognized voice signals output from the voice recognition component and analyzes and processes word usage in the recognized voice signals for syntax properties.

9. The system of claim 1, further comprising a natural language processing component that receives recognized voice signals output from the voice recognition component and analyzes and processes word usage in the recognized voice signals for natural language characteristics.

10. A method comprising:
under control of one or more processors configured with executable instructions,
receiving a partial query input comprising voice signals of a user and at least one of text, image or audio input by a user;
inferring in real-time, using a classifier, multiple different search goals based on the partial query input, the classifier comprising a support vector machine to find a hyperspace in a space of possible inputs to distinguish triggering input events from non-triggering input events, the classifier explicitly trained using generic training data and implicitly trained by observing user behavior;
deriving similar or matching character sets, terms, or phrases to the partial query input by accessing one or more query databases that store query-related information;
formulating at least one complete query based on the multiple different search goals;
presenting the at least one complete query to the user for editing;

processing the at least one complete query to return search results;

assigning search results to each of the possible interpretations for selection by the user;

outputting a confidence value associated with each of the multiple different search goals;

formulating a complete query for each of the multiple different search goals;

executing each complete query to return search results; and adjusting a number of the search results to be associated with each of the formal queries based at least in part on the associated confidence value.

11. The method of claim 10, further comprising:

outputting recognition results based on processing the partial query input; and processing the recognition results in combination with preliminary search results obtained from processing the at least one complete query to arrive at a final set of search results.

12. The method of claim 10, further comprising processing historical information about the user and utilizing the processed historical information to generate the at least one complete query.

13. The method of claim 10, further comprising performing a search based on the at least one complete query, and storing ambiguities derived as part of the search for processing of a future search.

14. The method of claim 10, further comprising monitoring user interaction with the at least one complete query and, learning and reasoning about the user interaction to refine a future partial query input.

15. A computer-readable storage device comprising instructions executable by one or more processors to perform acts comprising:

receive a partial query including voice signals of a user and at least one of text, image or audio input by the user;

inferring in real-time, using a classifier, multiple different intended search goals based on the partial query input, the classifier comprising a support vector machine to find a hyperspace in a space of possible inputs to distinguish triggering input events from non-triggering input events, the classifier explicitly trained using generic training data and implicitly trained by observing user behavior;

deriving similar or matching character sets, terms, or phrases to the partial query input by accessing one or more query databases that store query-related information;

generating at least one complete query based on the multiple different search goals;

presenting the at least one complete query to the user for editing; and processing the at least one complete query to return search results, the search results based on a confidence value indicating the confidence of converted voice signals relative to the partial query input as voice signals of the user.

16. The computer-readable storage device of claim 15, the acts further comprising tagging areas of a predefined ecosystem to enable processing the complete query based on the tagged areas.

17. The computer-readable storage device of claim 15, the acts further comprising formulating the complete query based on the inferred query information is operable to use alias processing to associate other characters, words, or phrases with the inferred query information to formulate the complete query.

18. The computer-readable storage device of claim 15, the acts further comprising learning user interaction information in response to the user interacting with the complete query, the learning based on edits or changes made by the user when interacting with the complete query.

* * * * *